(12) United States Patent
Todd et al.

(10) Patent No.: US 11,657,849 B1
(45) Date of Patent: May 23, 2023

(54) REDUCED FORM FACTOR, HIGH-DENSITY, FRONT-ACCESS ONLY AUTOMATED TAPE LIBRARY

(71) Applicant: QUANTUM CORPORATION, San Jose, CA (US)

(72) Inventors: Christian Allen Todd, Parker, CO (US); Jesse Baker, Sheridan, CO (US); Scott M. Rockwell, Aurora, CO (US); William A. Yearsley, Centennial, CO (US)

(73) Assignee: QUANTUM CORPORATION, San Jose, CA (US)

( * ) Notice: Subject to any disclaimer, the term of this patent is extended or adjusted under 35 U.S.C. 154(b) by 0 days.

(21) Appl. No.: 17/838,447

(22) Filed: Jun. 13, 2022

(51) Int. Cl.
*G11B 23/03* (2006.01)
*G11B 15/68* (2006.01)

(52) U.S. Cl.
CPC ........ *G11B 23/0316* (2013.01); *G11B 15/682* (2013.01); *G11B 15/6835* (2013.01); *G11B 23/0306* (2013.01); *G11B 23/0307* (2013.01)

(58) Field of Classification Search
CPC ............ G11B 23/0316; G11B 23/0306; G11B 23/0307
See application file for complete search history.

(56) References Cited

U.S. PATENT DOCUMENTS

| | | | | |
|---|---|---|---|---|
| 4,787,074 A * | 11/1988 | Deck | .................. | G11B 23/0316 369/30.55 |
| 7,387,485 B2 * | 6/2008 | Dickey | .............. | G11B 15/6835 369/30.43 |
| 8,265,786 B2 * | 9/2012 | Jesionowski | ........ | G11B 15/689 700/214 |
| 2003/0076618 A1 * | 4/2003 | Brace | .................. | G11B 15/6825 |
| 2005/0007692 A1 * | 1/2005 | Thompson | .......... | G11B 15/6835 |
| 2005/0036230 A1 * | 2/2005 | Dickey | .............. | G11B 15/6835 360/92.1 |
| 2005/0146808 A1 * | 7/2005 | Hoelsaeter | .......... | G11B 15/6835 360/92.1 |
| 2005/0195517 A1 * | 9/2005 | Brace | .................. | G11B 15/6835 360/92.1 |
| 2007/0139812 A1 * | 6/2007 | Minemura | .............. | G11B 15/68 360/96.4 |

(Continued)

*Primary Examiner* — Brian E Miller
(74) *Attorney, Agent, or Firm* — Roeder & Broder LLP; James P. Broder

(57) ABSTRACT

An automated tape library (10) includes a library housing (12) that is substantially rectangular box-shaped, including a first housing side (12A), a second housing side (12B), a housing rear (12C), a housing top (12D), a housing bottom (12E), and a housing front (12F). The library housing (12) defines a library width (10W) that is less than or equal to approximately 550 millimeters and a library depth (10D) that is at least approximately 1000 millimeters. The automated tape library (10) can further include a front door (16) that is movably coupled to the housing front (12F) to move between a closed configuration (11A) and an open configuration (11B); wherein the library housing (12) defines a library interior (14); and wherein full access to the library interior (14) is only provided through the front door (16) when the front door (16) has been moved to the open configuration (11B). The automated tape library (10) can also include at least one tape drive (20) that is coupled to the front door (16).

21 Claims, 15 Drawing Sheets

(56) References Cited

U.S. PATENT DOCUMENTS

| | | | |
|---|---|---|---|
| 2007/0217061 A1* | 9/2007 | Jesionowski | G11B 15/6835 360/92.1 |
| 2008/0131241 A1* | 6/2008 | King | B65G 1/1371 414/274 |
| 2010/0014179 A1* | 1/2010 | Wideman | G11B 15/6835 360/31 |
| 2010/0028110 A1* | 2/2010 | Todd | G11B 15/6835 414/267 |
| 2010/0053880 A1* | 3/2010 | Jesionowski | G11B 15/689 711/111 |
| 2014/0085800 A1* | 3/2014 | McIntosh | G11B 33/005 361/679.31 |
| 2014/0193226 A1* | 7/2014 | Hashimoto | G11B 15/6835 414/277 |
| 2015/0332727 A1* | 11/2015 | Krick | G11B 15/6895 360/92.1 |
| 2018/0268873 A1* | 9/2018 | Miranda Gavillan | G05D 23/1917 |
| 2018/0286463 A1* | 10/2018 | Miranda Gavillan | G11B 33/14 |

* cited by examiner

REDUCED FORM FACTOR, HIGH-DENSITY, FRONT-ACCESS ONLY AUTOMATED TAPE LIBRARY

BACKGROUND

Automated tape libraries are commonly utilized for purposes of writing data to and reading data from tape cartridges. In particular, the automated tape libraries typically include a robotic tape cartridge mover that selectively retrieves and/or moves tape cartridges as desired between storage slots and tape drives within the tape library. More specifically, upon receiving a signal to access a certain tape cartridge, the tape cartridge mover can be manipulated to physically retrieve the requested tape cartridge from its associated storage slot in the tape library. Subsequently, the tape cartridge mover moves the tape cartridge to an appropriate tape drive, and inserts the tape cartridge into a drive housing of the tape drive so that requested read/write operations can be performed. Upon completion of the requested read/write operations, the tape cartridge mover can then return the tape cartridge to an appropriate storage slot.

A typical automated tape library is configured such that certain components are accessible for service, repair and/or replacement via front door access, and other components are accessible for service, repair and/or replacement via rear door access. As such, most automated tape libraries today require access from multiple sides for use. Thus, such typical automated tape libraries must be positioned in a storage area with enough spacing around the automated tape library that access can be achieved via both the front door and the rear door. Additionally, typical automated tape libraries also require certain interior spacing so that the various internal components can be readily accessed by an operator or customer.

FIG. 10A is a simplified schematic illustration of a plurality of prior art automated tape libraries 1000A that show the required spacing or footprint for three such prior art automated tape libraries 1000A positioned in a side-by-side arrangement. As illustrated, each of such prior art automated tape libraries 1000A have a library width 1000W of 600 mm and a library depth 1000D of 1200 mm. With such design, three such automated tape libraries 1000A positioned in a side-by-side arrangement have an overall footprint width 1002W of 1800 mm.

Additionally, such prior art automated tape libraries 1000A are typically configured to retain up to 900 tape cartridges (with a separate storage slot for each tape cartridge). Thus, using three such prior art automated tape libraries 1000A, a customer is able to retain up to 2700 tape cartridges (each within a separate storage slot) within the overall footprint width 1002W of 1800 mm.

FIG. 10B is a simplified schematic illustration of a plurality of prior art automated tape libraries 1000B that show the required spacing or footprint for two such prior art automated tape libraries 1000B positioned in an end facing arrangement where access to both ends of the prior art automated tape libraries 1000B is required. Stated in another manner, with two prior art automated tape libraries 1000B positioned in an end facing arrangement, three aisles are required to gain full access to each of the prior art automated tape libraries 1000B, one aisle adjacent to the rear of each prior art automated tape library, and a third aisle between the two prior art automated tape libraries 1000B.

As illustrated, each of such prior art automated tape libraries 1000B again have a library width 1000W (illustrated in FIG. 10A) of 600 mm and a library depth 1000D of 1200 mm. With access doors 1004 for the prior art automated tape library 1000B that are substantially equal to the library width 1000W, the access doors 1004 have a door width 1004W that is also 600 mm. Thus, with two such prior art automated tape libraries 1000B positioned in such an end facing arrangement, with proper space allowances for the access doors 1004 at both ends of the prior art automated tape libraries 1000B to be fully opened to effectively access the interior components, an overall footprint depth 1006D of 4800 mm is required. More specifically, the overall footprint depth 1006D requires spacing for two prior art automated tape libraries that each have a library depth of 1200 mm, and additional spacing for front and rear access doors 1004 on each of the prior art automated tape libraries 1000B (or four total access doors 1004) each having a door width 1004W of 600 mm, for a total overall footprint depth 1006D of 4800 mm.

Additionally, since such prior art automated tape libraries 1000B are typically configured to retain up to 900 tape cartridges (with a separate storage slot for each tape cartridge), the two prior art automated tape libraries 1000B can retain up to 1800 tape cartridges within an overall housing footprint of 4.8 meters×0.6 meters=2.88 square meters. This equates to approximately 625 tape cartridges per square meter.

Tape storage density and accessibility are key factors for customers that utilize automated tape libraries for storage of large quantities of tape cartridges. Thus, it is desired to provide automated tape libraries that can provide greater tape storage density will still ensuring full and adequate accessibility for all components of the automated tape library.

SUMMARY

The present invention is directed toward an automated tape library including a library housing that is substantially rectangular box-shaped, including a first housing side, a second housing side, a housing rear, a housing top, a housing bottom, and a housing front. In various embodiments, the library housing defines a library width that is less than or equal to approximately 550 millimeters and a library depth that is at least approximately 1000 millimeters.

In some embodiments, the library width is less than or equal to approximately 500 millimeters.

In certain embodiments, the library width is less than or equal to approximately 450 millimeters.

In some embodiments, the library housing is sized so as to define a ratio of the library depth (in mm) to the library width (in mm) of at least approximately 2.40:1.

In many embodiments, the automated tape library further includes a front door that is movably coupled to the housing front to move between a closed configuration and an open configuration; wherein the library housing defines a library interior; and wherein full access to the library interior is only provided through the front door when the front door has been moved to the open configuration.

In some embodiments, the automated tape library further includes at least one tape drive that is coupled to the front door.

In certain embodiments, the front door includes a door body that defines a door cavity therein; and wherein the at least one tape drive is positioned substantially within the door cavity.

In some embodiments, the front door further includes a drive access door that is movably coupled to the door body;

and wherein the at least one tape drive is selectively removable from the door cavity when the drive access door has been opened relative to the door body.

In many embodiments, the automated tape library further includes a thermal dispersion assembly that is configured to disperse heat generated during use of the at least one tape drive.

In one embodiment, the thermal dispersion assembly includes (i) an air intake that draws air through the front door and into the library interior, (ii) at least one fan that exhausts heated air from the at least one tape drive into the door cavity so that the heated air moves in a generally upward direction within the door cavity, and (iii) an exhaust duct that is positioned near the housing top of the library housing, the exhaust duct including a duct inlet that receives the heated air from within the door cavity and a duct outlet that vents the heated air away from the library housing.

In certain embodiments, the automated tape library further includes at least two tape magazines that are selectively positionable within the library interior, each of the at least two tape magazines including a plurality of storage slots, each storage slot being configured to selectively receive and retain a tape cartridge.

In some embodiments, the at least two tape magazines are removable from the library interior through the front door when the front door is in the open configuration.

In certain embodiments, movement of the at least two tape magazines into and out of the library interior is guided by a magazine guide assembly including a plurality of guide rails.

In various embodiments, at least one tape magazine is positioned substantially adjacent to the first housing side; and at least one tape magazine is positioned substantially adjacent to the second housing side.

In some embodiments, the at least two tape magazines are configured to retain at least approximately 1000 tape cartridges within the library interior.

In other embodiments, the at least two tape magazines are configured to retain at least approximately 1190 tape cartridges within the library interior.

In certain embodiments, the library interior is configured to retain a ratio of tape cartridges to overall housing footprint (in square meters) of at least approximately 750:1.

In many embodiments, the automated tape library further includes at least one tape drive that is coupled to the front door; and a cartridge mover assembly that is configured to selectively move the tape cartridges between the storage slots and the at least one tape drive.

In some embodiments, the cartridge mover assembly is selectively removable from the library interior through the front door when the front door is in the open configuration.

In certain embodiments, the cartridge mover assembly includes a mover support shelf, and a cartridge mover that is coupled to the mover support shelf.

In various embodiments, the automated tape library further includes a power rail that is positioned within the library interior, the power rail being configured to provide power to the cartridge mover assembly.

In some embodiments, the power rail is selectively removable from the library interior through the front door when the front door is in the open configuration.

In certain embodiments, the automated tape library further includes a housing stabilization system that is configured to inhibit the library housing from tipping during movement of the library housing, the housing stabilization system including a stabilizer bar that is movably coupled to the housing bottom of the library housing, the stabilizer bar being selectively movable between an operative configuration wherein the stabilizer bar extends outwardly beyond at least one of the housing front, the housing rear, the housing first side and the housing second side, and a stowed configuration wherein the stabilizer bar does not extend outwardly beyond any of the housing front, the housing rear, the housing first side and the housing second side.

The present invention is further directed toward an automated tape library including a library housing that is substantially rectangular box-shaped and defines a library depth and a library width, the library housing including a first housing side, a second housing side, a housing rear, a housing top, a housing bottom, and a housing front; wherein the library housing is sized so as to define a ratio of the library depth (in mm) to the library width (in mm) of at least approximately 2.40:1.

The present invention is also directed toward an automated tape library including a library housing that is substantially rectangular box-shaped and defines a library interior, the library housing including a first housing side, a second housing side, a housing rear, a housing top, a housing bottom, and a housing front; and at least two tape magazines that are selectively positionable within the library interior, each of the at least two tape magazines including a plurality of storage slots, each storage slot being configured to selectively receive and retain a tape cartridge; wherein the library interior is configured to retain a ratio of tape cartridges to overall housing footprint (in square meters) of at least approximately 750:1.

The present invention is further directed toward a method of manufacturing an automated tape library having features such as described above.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Embodiments of the present invention are described herein in the context of an automated tape library (sometimes also referred to herein as a "tape library") having high-density tape cartridge storage capacity with a reduced form factor. More specifically, as provided in detail herein, the tape library of the present invention breaks away from a standard footprint for tape libraries by removing all "empty" space within the library housing so that the tape library can have a library width of as little as 450 mm as compared to a standard 600 mm wide tape library, while still improving on tape cartridge storage capacity in comparison to standard tape libraries. As a result, four of these reduced form factor, high-density tape cartridge storage capacity tape libraries can fit in the same space as three standard width tape libraries. The tape libraries of the present invention are also fully accessible from the front, only requiring access to the library interior through the front door, so that the tape library can be backed up against a wall and positioned side-by-side in contact with additional such tape libraries.

In certain embodiments, the tape libraries described herein are direct access libraries (as opposed to serial access libraries), where each of the tape cartridges retained therein can be directly accessed by a cartridge mover assembly without the need to move any other tape cartridges in order to effectively access a desired tape cartridge.

In some embodiments, the tape library can be air gap compatible.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
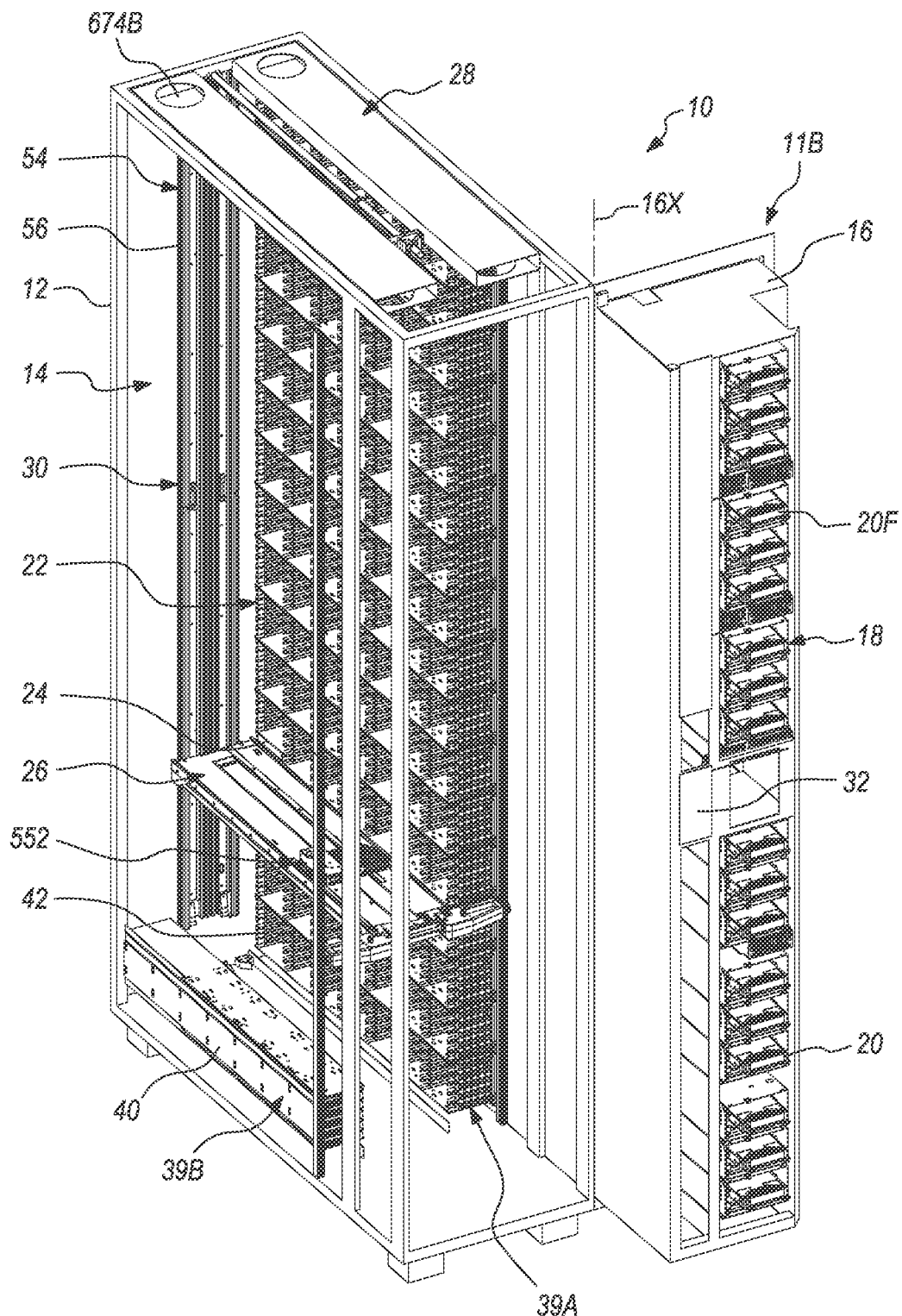
FIG. 1 is a simplified perspective view illustration of a portion of an embodiment of an automated tape library having features of the present invention.

FIG. 1 is a simplified perspective view illustration of a portion of an embodiment of an automated tape library 10 (also referred to herein simply as a "tape library") having features of the present invention. The design of the tape library 10 can be varied as desired. In particular, the tape library 10 can have any suitable design that is capable of storing a plurality of tape cartridges within a reduced library footprint. More specifically, it is noted that the tape library 10 illustrated in FIG. 1 is just one non-exclusive example of a tape library 10 usable with the present invention, and no limitations are intended based on the specific type and/or size of the tape library 10 shown in FIG. 1, except as recited in the claims appended hereto or added hereafter.

In various embodiments, the tape library 10 can include one or more of: (i) a library housing 12 that defines a library interior 14, (ii) a front door 16 that is coupled to the library housing 12, (iii) a tape drive system 18 including one or more tape drives 20, (iv) a tape cartridge storage system 22 (also referred to herein as a "cartridge storage system") that is configured to receive and retain a plurality of tape cartridges 24, (v) a cartridge mover assembly 26, (vi) a thermal dispersion assembly 28, (vii) a power/communications assembly 30, (viii) a control system 32, and (ix) a housing stabilization system 34 (illustrated, for example, in FIG. 8A). It is appreciated that in different embodiments, the tape library 10 can include more components or fewer components than what is illustrated and described in relation to FIG. 1. For example, in some embodiments, the tape library 10 can further include a graphical user interface (or "GUI").

In FIG. 1, a portion of the library housing 12 and a portion of the cartridge storage system 22 have been omitted and/or are shown as being transparent for purposes of clarity so that the library interior 14, and the various components positioned therein, is visible with greater clarity.

As an overview, there are numerous unique features included in the present invention. For example, in various embodiments, a tape library 10 configured in accordance with the teachings of the present invention can provide one or more of the following features, or minor variations therefrom, many of which can provide advantages over present technology:

(1) The library housing 12 of the tape library 10 can have a library width 10W (illustrated in FIG. 2) that is less than the standard 600 mm library width, and in certain embodiments can be as narrow as 450 mm;

(2) The library housing 12 of the tape library 10 can have a library depth 10D (illustrated in FIG. 2) that is equal to the standard library depth of between approximately 1200 mm and 1500 mm;

(3) The library housing 12 of the tape library 10 can have a library height 10H (illustrated in FIG. 2) that is equal to the standard library height of 48U (or eight feet, or approximately 2.133 meters);

(4) The cartridge storage system 22 of the tape library 10 can be configured to retain close to 1200 tape cartridges 24 in one non-exclusive embodiment;

(5) Full access to the library interior 14 of the library housing 12 is gained through use of front door 16 access only (no access is required by rear door or side door access);

(6) The reduced form factor (narrow width) tape library 10, with front door 16 only access, enables narrow aisle capability;

(7) The power/communications assembly 30 of the tape library 10 is configured to include a removeable power rail;

(8) The cartridge mover assembly 26 can utilize optical communications with a cartridge mover of the cartridge mover assembly 26;

(9) The tape drive system 18 is configured to include up to 18 full height tape drives 20 in one non-exclusive embodiment;

(10) The tape library 10 incorporates use of a drive bay magazine for import and export of tape cartridges into and out of the library interior 14 as defined by the library housing 12;

(11) The thermal dispersion assembly 28 is configured, in large part, within the front door 16, with excess heat being ducted out the top with fans, so no space is required for hot aisles adjacent to the rear or sides of the tape library;

(12) The tape library 10 is designed to include power cables and signal cables that are maintained separated from one another with no overlapping power cables and signal cables;

(13) Substantially all operational or active hardware of the tape library 10 is maintained within the front door 16;

(14) The housing stabilization system 34 utilizes stabilizing rollers to provide enhanced stability for the tape library 10 sufficient to support the narrow width of the library housing 12;

(15) The cartridge mover assembly 26 has a unique design that enables ease of removal, with a passive shelf having spring-loaded guide features (for compliant guiding), and a self-aligning cartridge mover, with only two quarter-turn screws being utilized for installing or removing the cartridge mover, and utilizing conductive rollers for power.

The library housing 12 is configured to retain various components of the tape library 10. For example, when the front door 16 is closed relative to the library housing 12, the tape drive system 18, the cartridge storage system 22, the cartridge mover assembly 26, the thermal dispersion assembly 28, the power/communications assembly 30, and the control system 32 can all be received and retained at least substantially, if not entirely, within the library interior 14 that is defined by the library housing 12.

Figure 2:
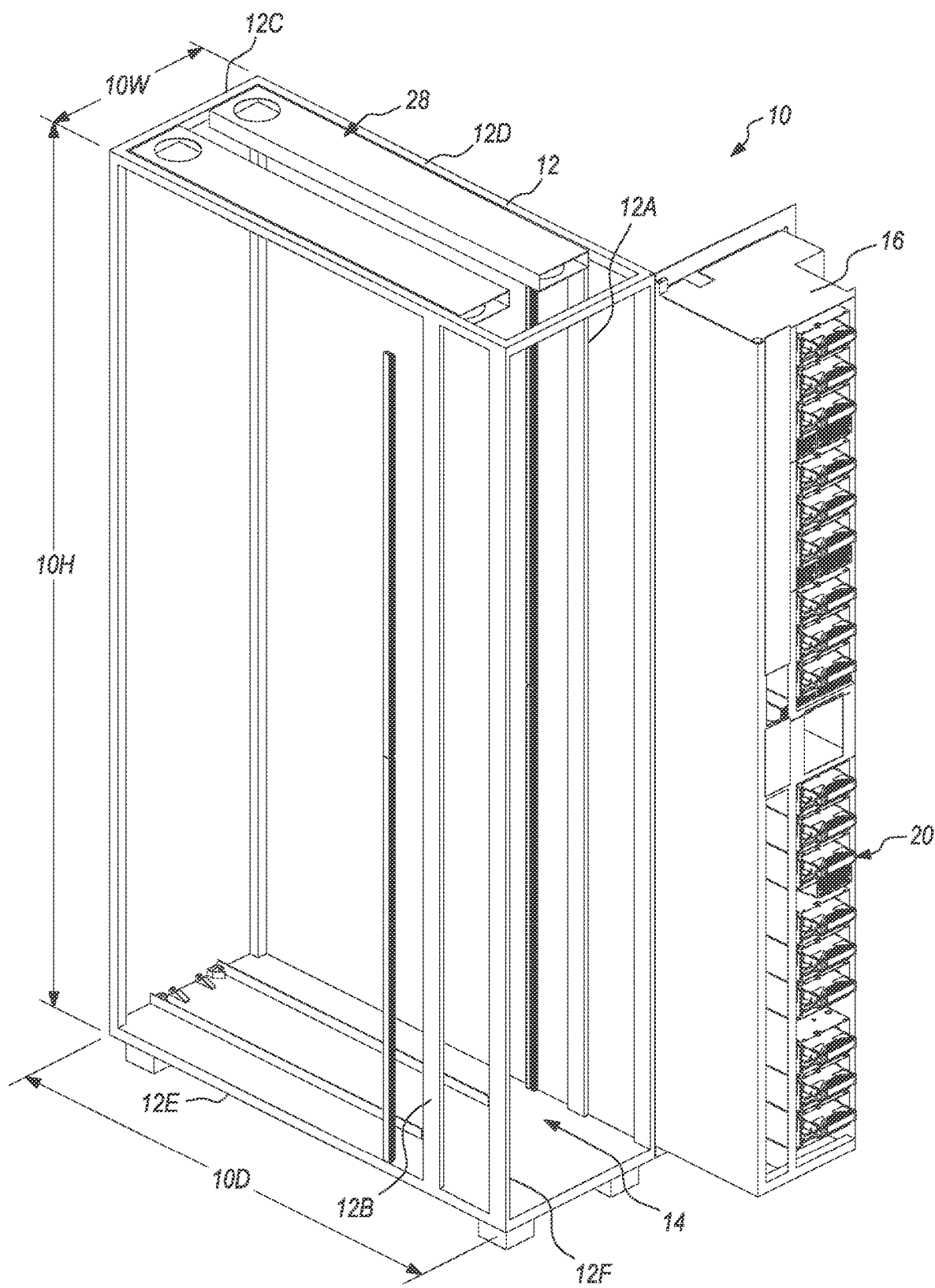
FIG. 2 is a simplified perspective view illustration of another portion of the automated tape library illustrated in FIG. 1.

Referring now to FIG. 2, FIG. 2 is a simplified perspective view illustration of another portion of the automated tape library 10 illustrated in FIG. 1. In particular, FIG. 2 is a simplified perspective view illustration of the tape library 10 with nearly all components removed or shown as transparent so that the library housing 12 can be shown with greater clarity. More specifically, as illustrated in FIG. 2, in relevant part, the cartridge storage system 22 (and the components thereof), the cartridge mover assembly 26 (and the components thereof), and the power/communications assembly 30 (and certain components thereof), have been removed from within the housing interior 14 as defined by the library housing 12 through the opened front door 16. This provides a significant advantage over prior art tape drives, which typically require access to the library interior through multiple doors, such as a front door and a rear door, in order to effectively access all such components within the library interior.

As provided in detail herein below, the tape drive system 18, at least some of the components of the thermal dispersion assembly 28, and at least some of the components of the power/communications assembly 30 are retained, at least in part, within the front door 16.

In certain embodiments, as illustrated in FIG. 2, the library housing 12 can be rigid and have a substantially rectangular-shaped cross-section, including a first housing side 12A, a second housing side 12B, a housing rear 12C, a housing top 12D, a housing bottom 12E, and a housing front 12F. As shown, the housing front 12F can be selectively opened by moving/opening the front door 16 relative to the library housing 12. Alternatively, the library housing 12 can have another suitable shape or configuration. For example, the library housing 12 can have a substantially square-shaped or any other suitable shaped cross-section. The library housing 12 may be constructed of any number of conventional materials such as, for example, those utilized in industry standard rack mount cabinets.

The size of the library housing 12 can be varied. In various embodiments, with the substantially rectangular-shaped cross-section, the library housing 12 can be said to define a library height 10H, a library depth 10D, and a library width 10W. In some embodiments, the library height 10H and the library depth 10D can be similar to that seen in standard tape libraries, but, as provided herein, the library width 10W is less than what is seen in standard tape libraries.

In certain embodiments, the library housing 12 can define a library height 10H of between approximately 1500 mm and 2500 mm. More particularly, in some embodiments, the library housing 12 can define a library height 10H of between approximately 1800 mm and 2400 mm. In other embodiments, the library housing 12 can define a library height 10H of between approximately 2000 mm and 2200 mm. In one non-exclusive embodiment, the library housing 12 can define a library height 10H of approximately 48U, which is equivalent to eight feet or approximately 2133 mm.

In some embodiments, the library housing 12 can define a library depth 10D of between approximately 800 mm and 1600 mm (or at least approximately 800 mm). More particularly, in certain embodiments, the library housing 12 can define a library depth 10D of between approximately 1000 mm and 1500 mm (or at least approximately 1000 mm). In other embodiments, the library housing 12 can define a library depth 10D of between approximately 1100 mm and 1400 mm (or at least approximately 1100 mm). In one non-exclusive embodiment, the library housing 12 can define a library depth 10D of approximately 1200 mm.

In certain embodiments, the library housing 12 can define a library width 10W of less than 600 mm, which is the library width of a standard tape library. More particularly, in some non-exclusive embodiments, the library housing 12 can define a library width 10W of less than or equal to approximately 575 mm, less than or equal to approximately 550 mm, less than or equal to approximately 525 mm, less than or equal to approximately 500 mm, or less than or equal to approximately 475 mm. In one non-exclusive embodiment, the library housing 12 can define a library width 10W of less than or equal to approximately 450 mm.

In some embodiments, the library housing 12 can be sized so as to define a ratio of library depth (in mm) to library width (in mm) of at least approximately 2.10:1, 2.15:1, 2.20:1, 2.25:1, 2.30:1, 2.35:1, 2.40:1, 2.45:1, 2.50:1, 2.55:1, 2.60:1, 2.65:1, 2.70:1, 2.75:1, 2.80:1, 2.85:1, 2.90:1, 2.95:1, 3.00:1, 3.05:1, or 3.10:1. Alternatively, the library housing 12 can be sized so as to define a ratio of library depth to library width of greater than approximately 3.10:1 or less than 2.10:1.

Returning again to FIG. 1, the front door 16 is movably and/or pivotably coupled to the library housing 12. In particular, the front door 16 is movably and/or pivotably coupled to the housing front 12F, such as about a pivot axis 16X (or hinge), such that the front door 16 is selectively movable between a closed configuration 11A (such as shown, for example, in the portion of the tape library illustrated in FIG. 6A), where the housing front 12F is closed off with the front door 16 such that there is only severely limited (such as through any door apertures that may be formed into the front door 16) or no access into the library interior 14, and an open configuration 11B (such as shown in FIG. 1), where the housing front 12F is open due to movement of the front door 16 to an open position, such that there is full access into the library interior 14. The front door 16 can be movably and/or pivotably coupled to the housing front 12F in any suitable manner. For example, in one non-exclusive embodiment, the front door 16 can be movably and/or pivotably coupled to the housing front 12F with a double-hinge type arrangement to ensure that the front door 16 can be fully opened without any of the tape drives 20 coming into contact with a door frame. Alternatively, the front door 16 can be movably and/or pivotably coupled to the housing front 12F with a simple hinge-type arrangement, or in another suitable manner.

It is appreciated that in various embodiments of the present invention, access to the library interior 14 through the front door 16 when the front door 16 is in the open configuration 11B is the only mechanism by which full access can be gained into the library interior 14 to access the various components retained therein. In many embodiments, there are no doors other than the front door 16, e.g., no side doors, rear doors or top doors, or any other access points through any of the first housing side 12A, the second housing side 12B, the housing rear 12C, the housing top 12D or the housing bottom 12E, through which access can be gained into the library interior 14 to access any of the various components retained therein.

The front door 16 is typically sized and shaped to match the entirety of the housing front 12F. More particularly, in many embodiments, the front door 16 has a door width 316W (illustrated in FIG. 3) and a door height 316H (illustrated in FIG. 3) that are substantially equal to the library width 10W (illustrated in FIG. 2) and the library height 10H (illustrated in FIG. 2), respectively. Alternatively, the size and/or shape of the front door 16 can be different than that of the housing front 12F such that the door width 316W can be different than the library width 10W and/or the door height 316H can be different than the library height 10H.

Figure 3:
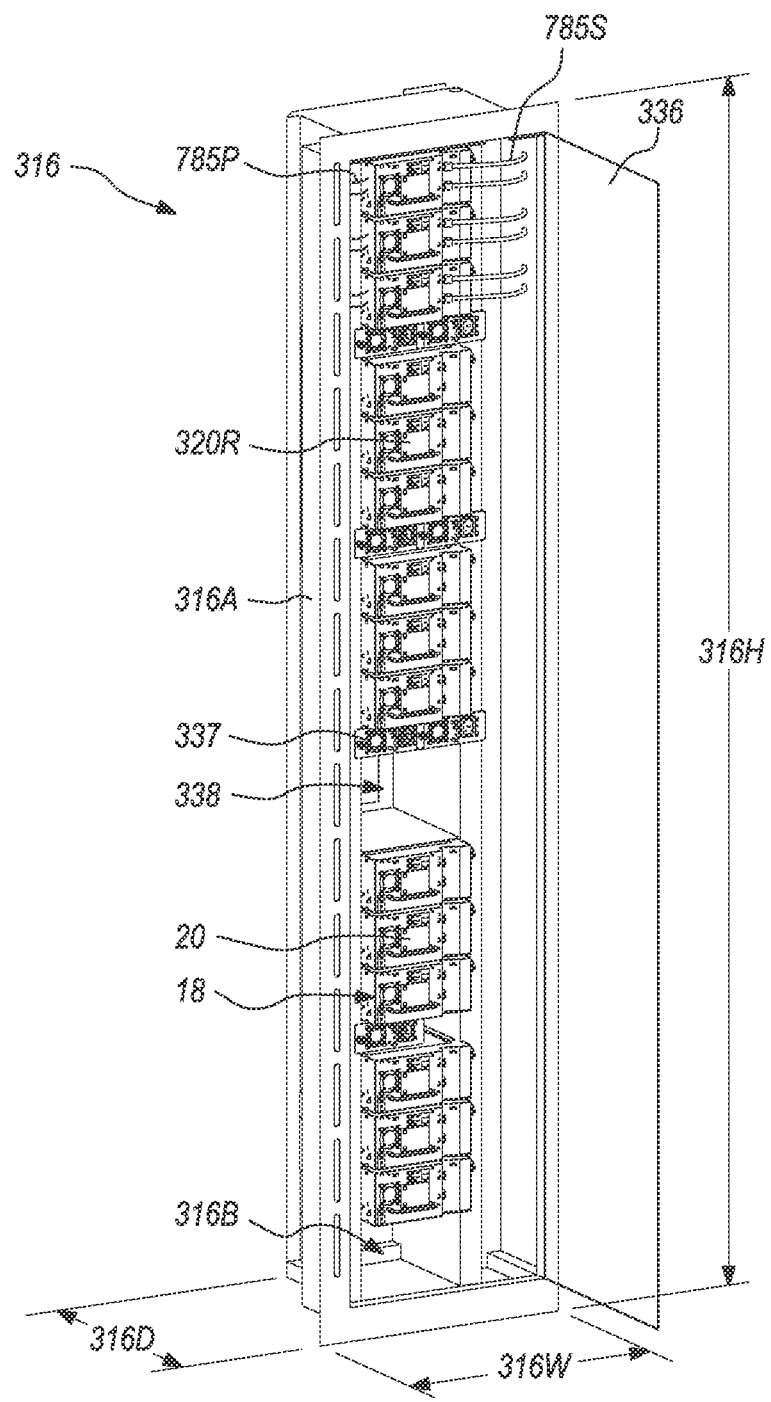
FIG. 3 is a simplified perspective view illustration of an embodiment of a front door usable as part of the automated tape library of FIG. 1.

Referring now to FIG. 3, FIG. 3 is a simplified perspective view illustration of an embodiment of the front door 316 usable as part of the automated tape library 10 of FIG. 1. The design, size and shape of the front door 316 can be varied. As shown, in certain embodiments, the front door 316 can include a door body 316A that defines a door cavity 316B, and a drive access door 336 that is movably and/or pivotably coupled to the door body 316A. As illustrated, the drive access door 336 can be selectively opened to provide access to the door cavity 316B. The drive access door 336 can further help to seal air flow routing within the door cavity 316B as part of the thermal dispersion assembly 28 (illustrated in FIG. 1). Alternatively, the front door 316 can have another suitable design.

As noted, in some embodiments, the front door 316 and/or the door body 316A typically includes a door width 316W that is substantially equal to the library width 10W (illustrated in FIG. 2), and a door height 316H that is substantially equal to the library height 10H (illustrated in FIG. 2).

As illustrated, in various embodiments, the front door 316 can have a door depth 316D that is sufficient such that the tape drive system 18 including the one or more tape drives 20 can be coupled to and/or retained substantially within the door cavity 316B of the front door 316. In some embodiments, when the front door 316 is in the closed configuration 11A (illustrated in FIG. 6A), a drive front 20F (illustrated in FIG. 1) of each of the tape drives 20 is facing into the library interior 14 (illustrated in FIG. 1) so that any tape cartridges 24 (illustrated in FIG. 1) may be inserted into and/or removed from any of the tape drives 20, such as through use of the cartridge mover assembly 26 (illustrated in FIG. 1).

In certain embodiments, as further illustrated in FIG. 3, the front door 316 can also include one or more access apertures 338 through which certain components that are retained within the library interior 14 may be removed from the library interior 14 without the need to move the front door 316 to the open configuration 11B (illustrated in FIG. 1), i.e. with the front door 316 in the closed configuration 11A. Stated in another manner, in some embodiments, the one or more access apertures 338 can function as an import/export station for various components of the tape library 10. For example, in various embodiments, the one or more access apertures 338 can function as an import/export station for moving tape cartridges 24 into and out of the library interior 14, such as through the use of a cartridge transporter 448 (illustrated in FIG. 4D). In some embodiments, the use of the cartridge transporter 448 can be a manual process for the user or operator to move tape cartridges 24 into and out of the library interior 14. In other embodiments, the use of the cartridge transporter 448 can be an automated process to move tape cartridges 24 into and out of the library interior 14.

The size, shape and positioning of the access aperture(s) 338 can be varied. For example, in one non-exclusive alternative embodiment, an access aperture 338 can be substantially rectangular-shaped and can be positioned approximately at a midpoint of the front door 316 relative to the door height 316H. In certain embodiments, the access aperture(s) can be sized appropriately so that the cartridge transporter 448 can fit snugly therein. In some embodiments, the one or more access apertures 338 can be positioned between tape drives 20 of the tape drive system 18. Additionally, or in the alternative, the access aperture(s) 338 can have a different design and/or be positioned in a different manner.

As shown, in some embodiments, the access aperture(s) 338 can only be accessed when the drive access door 336 has been opened relative to the door body 316A. Alternatively, in one embodiment, the access aperture(s) 338 can be configured to extend through the drive access door 336 so that the drive access door 336 does not need to be opened in order to effectively access the access aperture(s) 338.

As also illustrated in FIG. 3, when the drive access door 336 has been opened relative to the door body 316A, a drive rear 320R of each of the tape drives 20 of the tape drive system 18 can be accessed without moving the front door 316 to the open configuration 11B. With such design, it is appreciated that the tape drives 20 can be cleaned, maintained, removed, repaired and/or replaced without having to move the front door 316 to the open configuration 11B.

As noted, the tape drive system 18, including the one or more tape drives 20, can be coupled to and/or retained substantially within the door cavity 316B of the front door 316. The one or more tape drives 20 are configured for reading and/or writing data with respect to the tape cartridges 24. The number of tape drives 20 provided within the tape library 10 can be varied to suit the specific requirements of the tape library 10. For example, in certain non-exclusive embodiments, the tape library 10 can include between ten (full-height) tape drives 20 and twenty (full-height) tape drives 20 that are stacked substantially one on top of another (with limited spacing therebetween). More particularly, in some embodiments, the tape library 10 can be configured to include 10, 11, 12, 13, 14, 15, 16, 17, 18, 19 or 20 (full-height) tape drives 20. In one specific embodiment, as illustrated, the tape library 10 is configured to include 18 (full-height) tape drives 20. Moreover, in one embodiment, the tape library 10 can include a tape drive to tape cartridge ratio of 1:67. Alternatively, the tape library 10 can be configured to include greater than twenty (full-height) tape drives 20 or fewer than ten (full-height) tape drives 10. Still alternatively, the tape library 10 can be configured to include any suitable number of half-height tape drives, such as between twenty (half-height) tape drives and forty (half-height) tape drives in certain non-exclusive alternative embodiments. Yet alternatively, in another embodiment, one or more of the tape drives 20 can be replaced with additional data storage, such as additional tape cartridges 24.

As also shown in FIG. 3, the front door 316 can further include one or more redundant power supplies 337 that can be positioned substantially adjacent to and/or between certain tape drives 20 of the tape drive system 18.

Returning again to FIG. 1, as shown, the cartridge storage system 22 is positioned within the library interior 14 and is configured to receive and retain the plurality of tape cartridges 24. As shown in the embodiment illustrated in FIG. 1, the cartridge storage system 22 can include a first set of storage magazines 39A having one or more storage magazines 40 that are positioned within the library interior 14 substantially adjacent to the first housing side 12A (illustrated in FIG. 2), and a second set of storage magazines 39B having one or more storage magazines 40 that are positioned within the library interior 14 substantially adjacent to the second housing side 12B (illustrated in FIG. 2). Each of the storage magazines 40 in both the first set of storage magazines 39A and the second set of storage magazines 39B can include one or more storage slots 42 that are each configured to receive and retain (and store) one of the tape cartridges 24.

The number of storage magazines 40 within the first set of storage magazines 39A, and the number of storage slots 42 within each of such storage magazines 40, can be varied. For example, in certain non-exclusive embodiments, the first set of storage magazines 39A can include 10, 11, 12, 13, 14, 15, 16, 17, 18, 19 or 20 storage magazines 40 that are stacked substantially one on top of another (with limited spacing in between). In one specific, non-exclusive embodiment, the first set of storage magazines 39A can include 17 storage magazines 40 that are stacked substantially one on top of another (with limited spacing in between). Alternatively, the first set of storage magazines 39A can include greater than 20 or fewer than 10 storage magazines 40.

In some non-exclusive embodiments, each of the storage magazines 40 in the first set of storage magazines 39A can include 10, 15, 20, 25, 30, 35, 40, 45 or 50 storage slots 42. In one specific, non-exclusive embodiment, such as illustrated in FIG. 4C, each of the storage magazines 40 in the first set of storage magazines 39A can include 35 storage slots 42 that are configured with seven columns of storage slots 42, and with five storage slots 42 within each column. Alternatively, each of the storage magazines 40 in the first set of storage magazines 39A can include a different number of storage slots 42 and/or the storage slots 42 can be arranged in a different manner than the specific examples noted above.

It is appreciated that in the specific embodiment where the first set of storage magazines 39A includes 17 storage magazines 40, and 35 storage slots 42 within each storage magazine 40, the first set of storage magazines 39A is able to effectively receive and retain (and store) up to 595 tape cartridges 24. Alternatively, the first set of storage magazines 39A can be configured to receive and retain (and store) greater than 595 or fewer than 595 tape cartridges 24.

Similarly, the number of storage magazines 40 within the second set of storage magazines 39B, and the number of storage slots 42 within each of such storage magazines 40, can be varied. For example, in certain non-exclusive embodiments, the second set of storage magazines 39B can include 10, 11, 12, 13, 14, 15, 16, 17, 18, 19 or 20 storage magazines 40 that are stacked substantially one on top of another (with limited spacing in between). In one specific, non-exclusive embodiment, the second set of storage magazines 39B can include 17 storage magazines 40 that are stacked substantially one on top of another (with limited spacing in between). Alternatively, the second set of storage magazines 39B can include greater than 20 or fewer than 10 storage magazines 40.

In some non-exclusive embodiments, each of the storage magazines 40 in the second set of storage magazines 39B can include 10, 15, 20, 25, 30, 35, 40, 45 or 50 storage slots 42. In one specific, non-exclusive embodiment, as shown in FIG. 4C, each of the storage magazines 40 in the second set of storage magazines 39B can include 35 storage slots 42 that are configured with seven columns of storage slots 42, and with five storage slots 42 within each column. Alternatively, each of the storage magazines 40 in the second set of storage magazines 39B can include a different number of storage slots 42 and/or the storage slots 42 can be arranged in a different manner than the specific examples noted above.

It is appreciated that in the specific embodiment where the second set of storage magazines 39B includes 17 storage magazines 40, and 35 storage slots 42 within each storage magazine 40, the second set of storage magazines 39B is able to effectively receive and retain (and store) up to 595 tape cartridges 24. Alternatively, the second set of storage magazines 39B can be configured to receive and retain (and store) greater than 595 or fewer than 595 tape cartridges 24.

In alternative embodiments, the tape library 10 can include a different number of storage magazines 40 within each of the sets of storage magazines 39A, 39B, and/or each of the storage magazines 40 can include a different number of storage slots 42 than the specific examples noted herein above. Still alternatively, the tape library 10 can be configured with only a single set of storage magazines.

It is appreciated that the first set of storage magazines 39A can have a design, configuration and storage capacity that is substantially similar to that of the second set of storage magazines 39B, or the first set of storage magazines 39A can have a design, configuration and storage capacity that is different than that of the second set of storage magazines 39B.

Figure 4A:
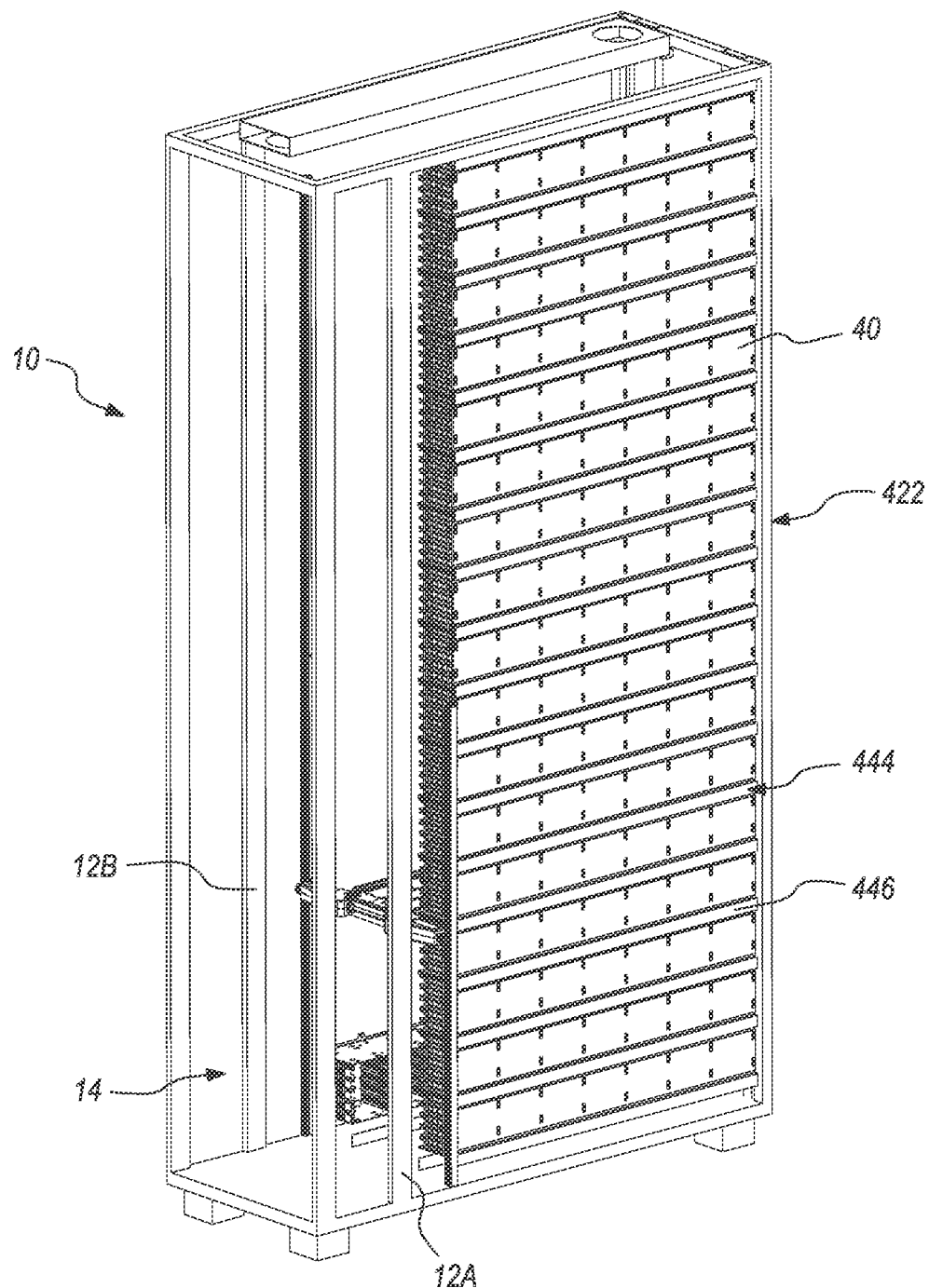
FIG. 4A is a simplified perspective view illustration of a portion of the automated tape library of FIG. 1 including a portion of an embodiment of a cartridge storage system usable as part of the automated tape library.

FIG. 4A is a simplified perspective view illustration of a portion of the automated tape library 10 of FIG. 1, including a portion of an embodiment of the cartridge storage system 422 usable as part of the automated tape library 10. In particular, FIG. 4A illustrates that the cartridge storage system 422 can further include a magazine guide assembly 444 that is configured to enable the user or operator to more easily move and/or guide the magazines 40 into and out of the library interior 14. More specifically, as shown, the magazine guide assembly 444 can include a plurality of guide rails 446 that are positioned substantially adjacent to one or both of the housing sides 12A, 12B (such guide rails 446 are only shown positioned substantially adjacent to the first housing side 12A in FIG. 4A, but it is appreciated that additional guide rails 446 can also be positioned substantially adjacent to the second housing side 12B). The guide rails 446 are positioned and configured such that each magazine 40 can be guided into and out of position within the library interior 14 by sliding the magazine 40 relative to and/or between two guide rails 446, with one guide rail 446 substantially directly below the magazine 40 and the other guide rail 446 substantially directly above the magazine 40. In various embodiments, the magazines 40 can be removed from within the library interior 14, by sliding relative to the guide rails 446, through the open front door 16 (illustrated in FIG. 1).

Figure 4B:
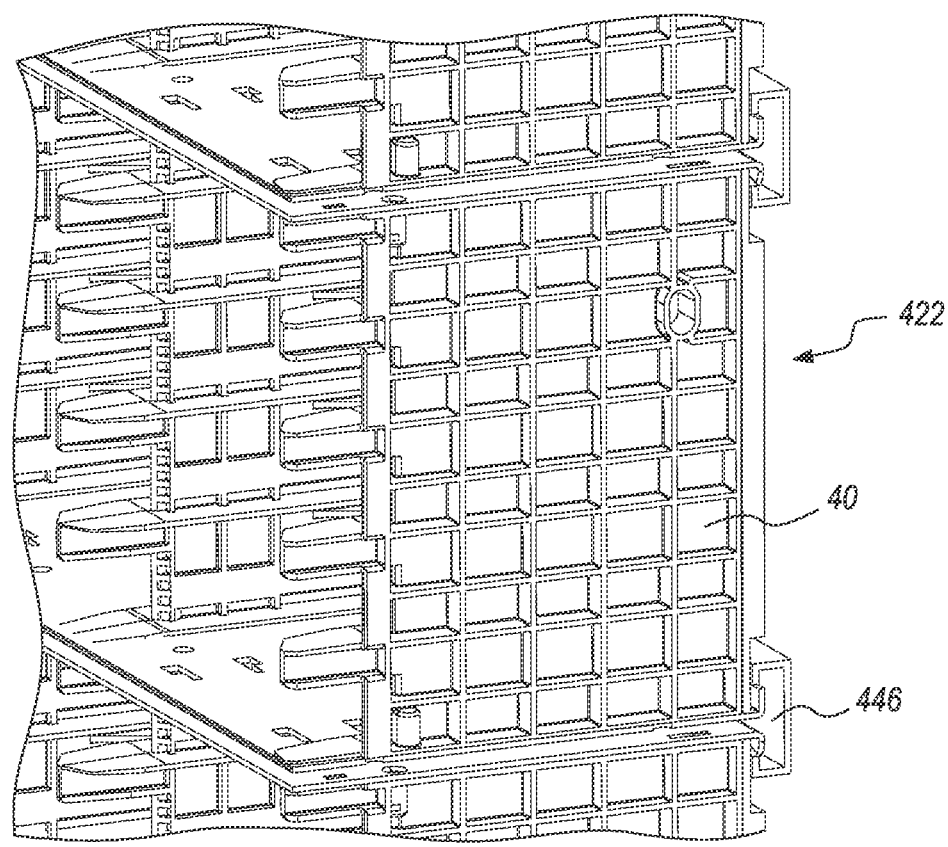
FIG. 4B is a simplified perspective view illustration of a portion of the cartridge storage system illustrated in FIG. 4A.
Figure 4C:
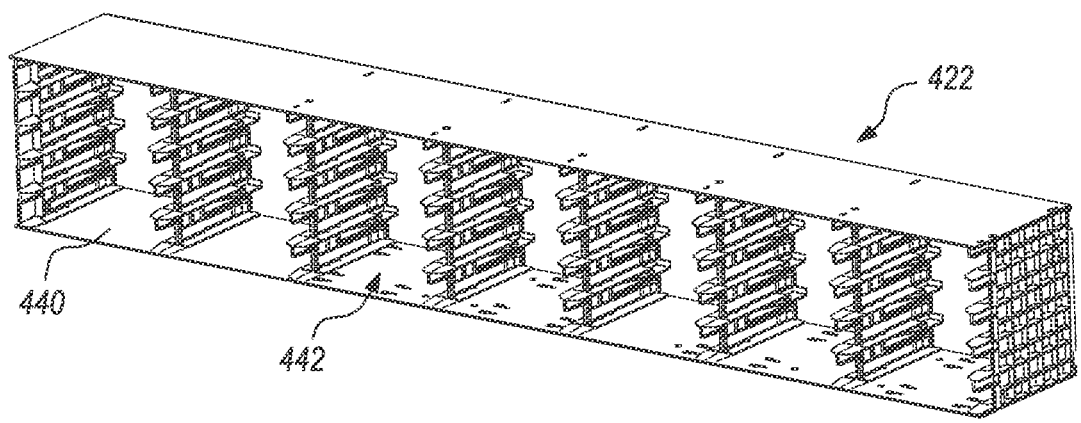
FIG. 4C is a simplified perspective view illustration of another portion of the cartridge storage system illustrated in FIG. 4A.

FIG. 4B is a simplified perspective view illustration of a portion of the cartridge storage system 422 illustrated in FIG. 4A. In particular, FIG. 4B is a simplified perspective view illustration showing a portion of one of the magazines 40 being positioned between two of the guide rails 446.

FIG. 4C is a simplified perspective view illustration of another portion of the cartridge storage system 422 illustrated in FIG. 4A. More particularly, FIG. 4C is a simplified perspective view illustration of one embodiment of a magazine 440 that can be used within the tape library 10. As shown in this embodiment, the magazine 440 includes 35 storage slots 442 that are arranged in seven columns, with five storage slots 442 within each column. Alternatively, the tape library 10 can include magazines 440 that have greater than 35 or less than 35 storage slots 442, and/or where the storage slots 442 are arranged in a different manner than what is shown in FIG. 4C.

Figure 4D:
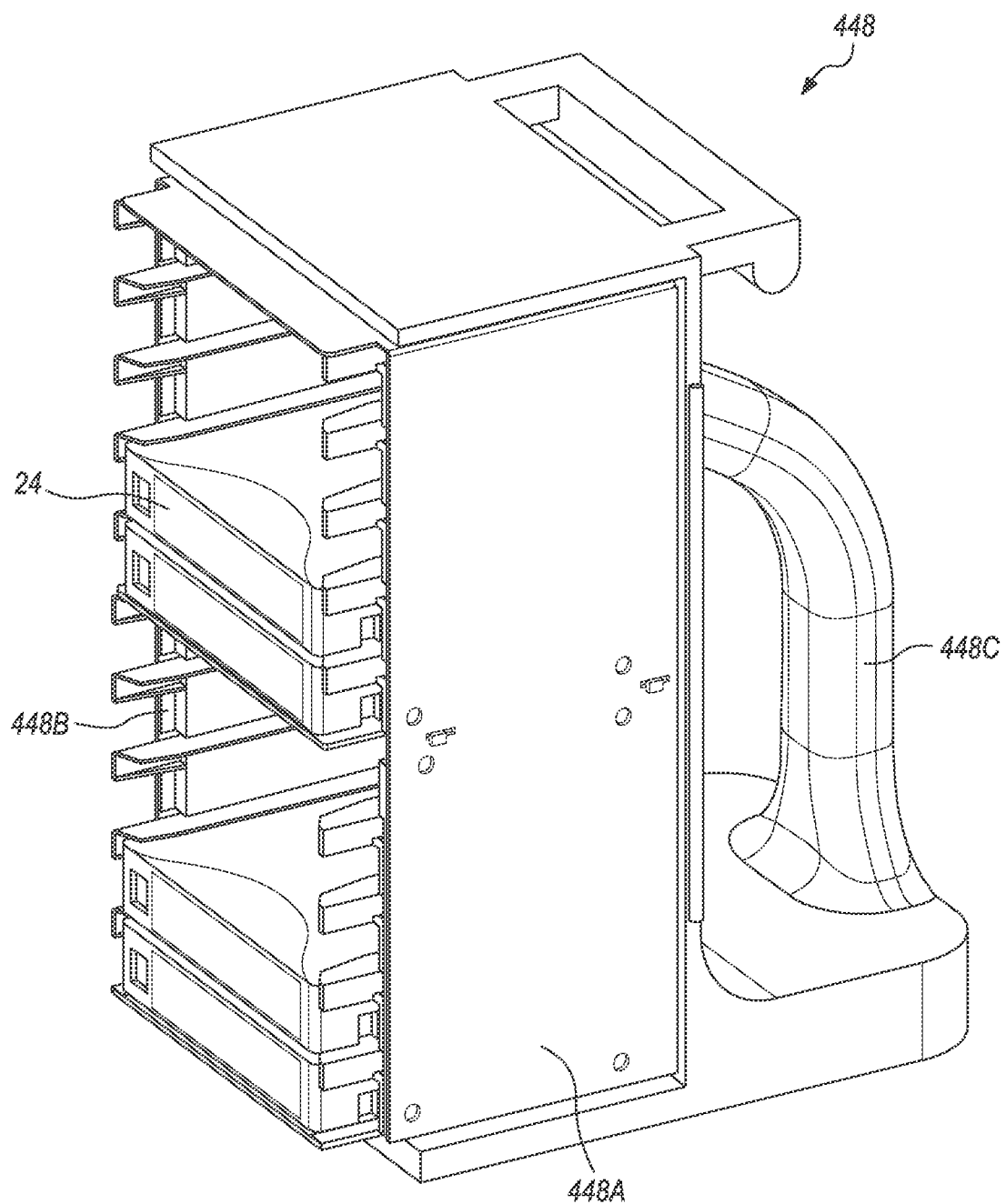
FIG. 4D is a simplified perspective view illustration of an embodiment of a cartridge transporter that is usable to move tape cartridges into and out of the automated tape library of FIG. 1.

FIG. 4D is a simplified perspective view illustration of an embodiment of a cartridge transporter 448 that is usable to move tape cartridges 24 into and out of the automated tape library 10 of FIG. 1. More particularly, in certain embodiments, the cartridge transporter 448 is usable in conjunction with the cartridge mover assembly 26 (illustrated in FIG. 1) for moving the tape cartridges 24 into and out of the library interior 14 (illustrated in FIG. 1), such as through use of the access aperture(s) 338 (illustrated in FIG. 3) formed into the front door 316 (illustrated in FIG. 3). It is appreciated that any new tape cartridges 24 that may have been moved into the library interior 14 through use of the cartridge transporter 448 can then be moved between the storage slots 442 (illustrated in FIG. 4A) and the tape drives 20 (illustrated in FIG. 1) through use of the cartridge mover assembly 26 as desired.

The design of the cartridge transporter 448 can be varied to suit the design of the tape library 10. In various embodiments, the cartridge transporter 448 can include a transporter body 448A, transporter slots 448B that are formed into the transporter body 448A, and a transporter handle 448C. Alternatively, the cartridge transporter 448 can include more components or fewer components than those specifically illustrated and described herein. For example, in one non-exclusive alternative embodiment, the cartridge transporter 448 can be designed without the transporter handle 448C.

In some embodiments, the transporter body 448A can be sized and shaped to fit relatively snugly within the access aperture(s) 338 that are formed into the front door 316. More particularly, in certain embodiments, the transporter body 448A can be substantially rectangular-shaped, and be the same size as the access aperture(s) 338 formed into the front door 316, such that the cartridge transporter 448 can be positioned and effectively retained within the access aperture(s) 338. Alternatively, the transporter body 448A can have another suitable size and shape.

As noted, the cartridge transporter 448 further includes the transporter slots 448B that are formed into the transporter body 448A. Each of the transporter slots 448B can be configured to receive and retain a single tape cartridge 24 as the tape cartridge 24 is being moved into or out of the library interior 14. In one non-exclusive embodiment, the cartridge transporter 448 can be configured to include ten transporter slots 448B so that ten tape cartridges 24 can be effectively received and retained therein at any given time. Alternatively, the cartridge transporter 448 can be configured to include greater than ten or fewer than ten transporter slots 448B.

As shown in FIG. 4D, the transporter handle 448C is coupled to the transporter body 448A. The transporter handle 448C is configured to be gripped by the user or operator as they move the cartridge transporter 448 to and from the access aperture(s) 338 formed into the front door 316. In certain embodiments, the transporter handle 448C can be ergonomically designed so that it can be easily gripped and held by the user or operator as they are moving tape cartridges 24 into and out of the library interior 14. Alternatively, the transporter handle 448C can have another suitable design.

Referring again back to FIG. 1, the cartridge mover assembly 26 is configured to selectively, such as upon request of a user, retrieve and move the tape cartridges 24 as desired between the storage slots 42 and the tape drives 20. In particular, during use, upon receiving a signal from the control system 32 to access a certain tape cartridge 24, the cartridge mover assembly 26 can be manipulated to physically retrieve the requested tape cartridge 24 from its associated storage slot 42 in the tape library 10. Subsequently, the cartridge mover assembly 26 moves the tape cartridge 24 to an appropriate tape drive 20, and inserts the tape cartridge 24 through the drive front 20F into a drive housing of the tape drive 20 so that the requested read/write operations can be performed. Upon completion of the requested read/write operations, the cartridge mover assembly 26 can then return the tape cartridge 24 to an appropriate storage slot 42.

Figure 5A:
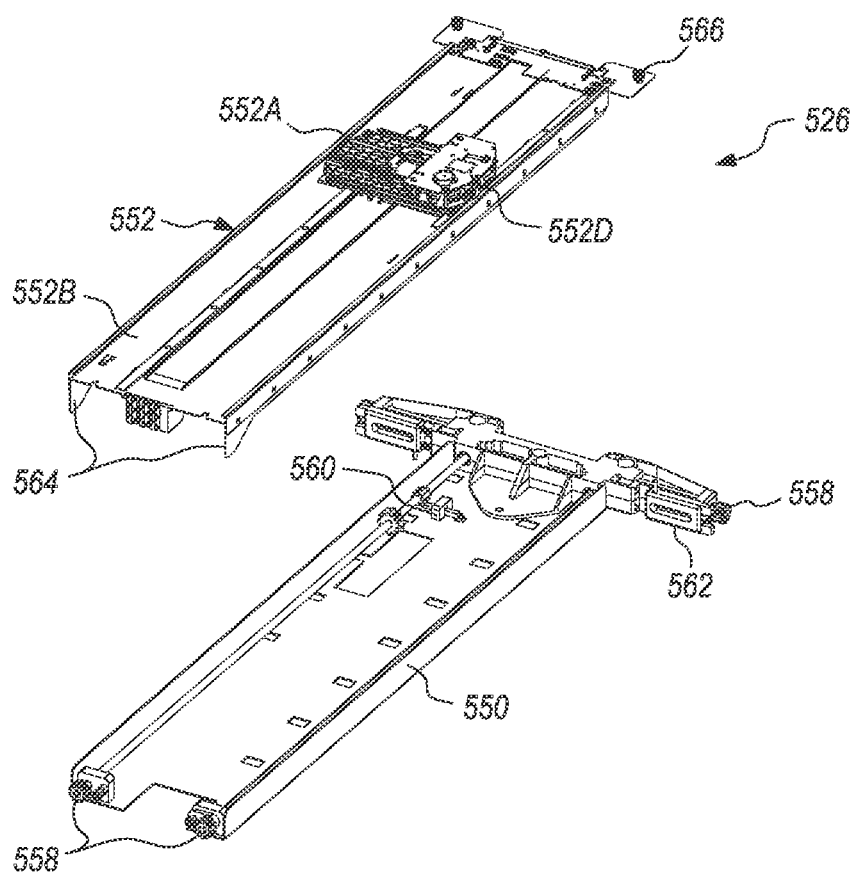
FIG. 5A is a simplified exploded view illustration of an embodiment of a mover assembly usable as part of the automated tape library of FIG. 1.

FIG. 5A is a simplified exploded view illustration of a portion of an embodiment of a cartridge mover assembly 526 usable as part of the automated tape library 10 of FIG. 1. The cartridge mover assembly 526 can have any suitable design for purposes of retrieving and moving the tape cartridges 24 (illustrated in FIG. 1) as desired between the storage slots 42 (illustrated in FIG. 1) and the tape drives 20 (illustrated in FIG. 1). For example, in various embodiments, the cartridge mover assembly 526 can include one or more of a mover support shelf 550, a cartridge mover 552 including a mover body 552A (such as any suitable picker mechanism), a body support frame 552B, a first mover actuator 552C (illustrated in FIG. 5B), and a second mover actuator 552D (illustrated in phantom), and a rack assembly 54 (illustrated in FIG. 1) including one or more racks 56 (illustrated in FIG. 1). Alternatively, the cartridge mover assembly 526 can include more components or fewer components than those illustrated and described herein.

The mover support shelf 550 is configured to support the cartridge mover 552 during use of the tape library 10 and/or the cartridge mover assembly 526. The design of the mover support shelf 550 can be varied. As shown, in certain embodiments, the mover support shelf 550 can be somewhat T-shaped, and can include one or more rack engagers 558 that are each configured to movably engage one of the one or more racks 56 of the rack assembly 54. More particularly, in some embodiments, the rack engagers 558 can be provided in the form of self-aligning climber gears that are configured to engage the racks 56 and move along the racks 56 as the mover support shelf 550 with the cartridge mover 552 supported thereon and/or coupled thereto is moved up and down vertically relative to the cartridge storage system 22 (illustrated in FIG. 1). In certain embodiments, the first mover actuator 552C is coupled to the body support frame 552B, such as to a bottom surface 559 (illustrated in FIG. 5B) of the body support frame 552B, in order to move the mover support shelf 550 with the cartridge mover 552 supported thereon and/or coupled thereto up and down vertically relative to the cartridge storage system 22. Alternatively, the mover support shelf 550 can have a different design and/or the mover support shelf 550, with the cartridge mover 552 supported thereon and/or coupled thereto, can be moved up and down vertically relative to the cartridge storage system 22 in another suitable manner.

As also illustrated in FIG. 5A, in certain embodiments, the mover support shelf 550 can further include a shelf latch 560, which inhibits vertical movement of the mover support shelf 550 during and after removal of the cartridge mover 552 from the mover support shelf 550 by locking the rack engagers 558 so the rack engagers 558 do not rotate.

The mover body 552A is movably positioned on and is supported by the body support frame 552B. In one embodiment, the body support frame 552B is fixedly coupled to, is positioned on top of, and is supported by the mover support shelf 550. As shown, the mover body 552A is also configured to move substantially laterally and/or horizontally along the body support frame 552B, such as via the second mover actuator 552D. In certain embodiments, the body support frame 552B can include at least one mover guide 564 (two are shown in FIG. 5A) that are configured to guide movement of the mover body 552A along the body support frame 552B, and/or such that the cartridge mover 552 is properly aligned relative to the mover support shelf 550.

The rack assembly 54 and/or the one or more racks 56 are configured to support the mover support shelf 550, and thus the cartridge mover 552, during use of the cartridge mover assembly 526 within the tape library 10. The design and configuration of the rack assembly 54 can be varied to suit the specific requirements of the tape library 10. For example, in one non-exclusive embodiment, the rack assembly 54 can include four individual racks 56 that are spaced apart from one another. In some embodiments, each rack 56 can be oriented in a generally vertical direction and can extend a height that is sufficient to enable the cartridge mover 552 to effectively retrieve a tape cartridge 24 from any of the plurality of storage slots 42. Alternatively, the rack assembly 54 can include a different number of racks 56. For example, in some non-exclusive alternative embodiments, the rack assembly 54 can include two racks 56, three racks 56 or more than four racks 56 that can be spaced apart from one another.

Thus, when a request is received to access a certain tape cartridge 24 and/or a certain storage slot 42, the mover support shelf 550 (and thus the mover support frame 552B and the mover body 552A of the cartridge mover 552) is configured to move up or down as necessary along the racks 56 of the rack assembly 54, and the mover body 552A is configured to move along the mover support frame 552B as necessary. Subsequently, the mover support shelf 550 (and thus the mover support frame 552B and the mover body 552A of the cartridge mover 552) will be moved up or down as necessary along the racks 56 of the rack assembly 54, and the mover body 552A is configured to move along the mover support frame 552B as necessary so that the certain tape cartridge 24 is moved to and inserted into one of the one or more tape drives 20.

FIG. 5A also illustrates that the body support frame 552B can include one or more mover attachers 566 that are configured to selectively attach the body support frame 552B, and thus the cartridge mover 552 as a whole, to the mover support shelf 550. In one embodiment, the mover attacher(s) 566 can be provided in the form of attachment thumbscrews that simply require quarter turns in order to selectively attach the body support frame 552B (and thus the cartridge mover 552 as a whole) to the mover support shelf 550, and/or detach the body support frame 552B (and thus the cartridge mover 552 as a whole) from the mover support shelf 550.

In various embodiments, the cartridge mover assembly 526, including the mover support shelf 550 and the cartridge mover 552, can be removed either individually or collectively from within the library interior 14 (illustrated in FIG. 1) through the open front door 16 (illustrated in FIG. 1).

In some embodiments, the cartridge mover assembly 526 has a unique design that enables ease of removal, with a passive mover support shelf 550 (with no motors, cards or cables) having spring-loaded guide features 562 (for compliant guiding), and a self-aligning cartridge mover 552, with only two quarter-turn screws being utilized for installing or removing the cartridge mover 552, and utilizing conductive rollers for power.

Figure 5B:
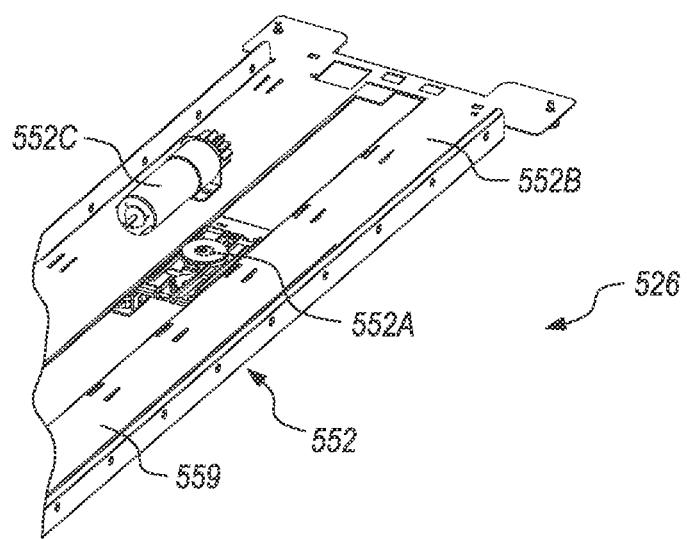
FIG. 5B is a simplified bottom perspective view illustration of a portion of the mover assembly illustrated in FIG. 4A.

FIG. 5B is a simplified bottom perspective view illustration of a portion of the cartridge mover assembly 526 illustrated in FIG. 5A. In particular, FIG. 5B is a simplified bottom perspective view of the cartridge mover 552, including the mover body 552A, the body support frame 552B, and the first mover actuator 552C. As shown, in one non-exclusive embodiment, the first mover actuator 552C can be mounted on and/or coupled to a bottom surface 559 of the body support frame 552B. Alternatively, the mover actuator 552C can be positioned in another suitable manner.

Returning again to FIG. 1, it is appreciated that although a single cartridge mover assembly 26 and a single cartridge mover 552 are illustrated in FIG. 1, the tape library 10 can be designed to include more than one cartridge mover assembly 26 and/or more than one cartridge mover 552. For example, in one non-exclusive alternative embodiment, the tape library 10 can include two cartridge mover assemblies 26 and/or two cartridge movers 552 to function in different portions of the tape library 10 and/or to provide redundancy in the event that one of the cartridge mover assemblies 26 and/or cartridge movers 552 fails.

Figure 6A:
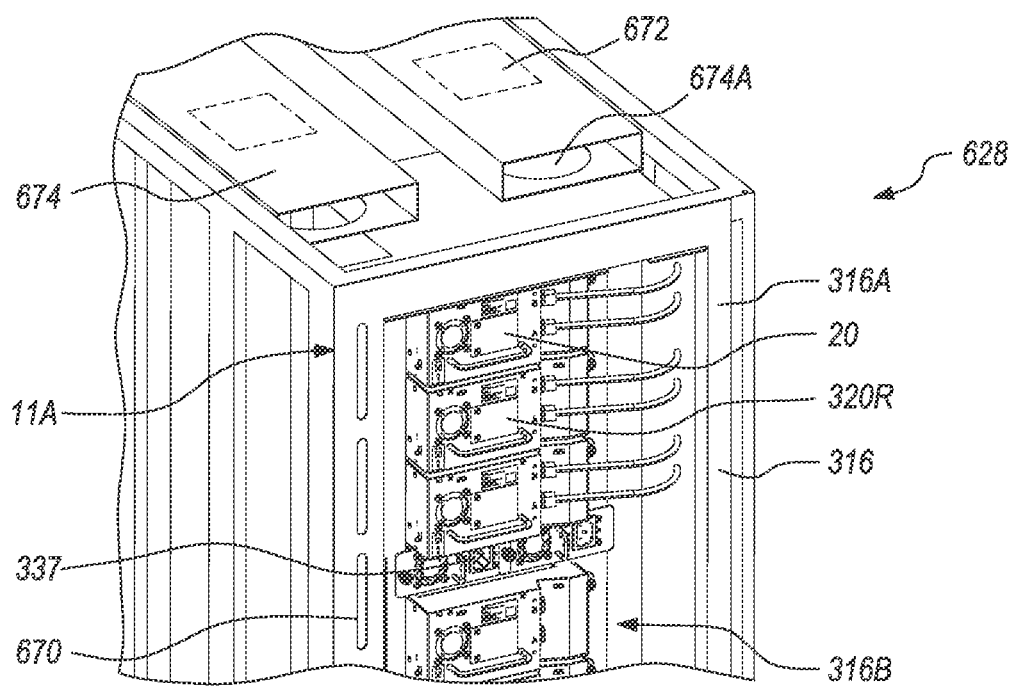
FIG. 6A is a simplified perspective view illustration of a portion of an embodiment of a thermal dispersion assembly usable as part of the automated tape library of FIG. 1.
Figure 6B:
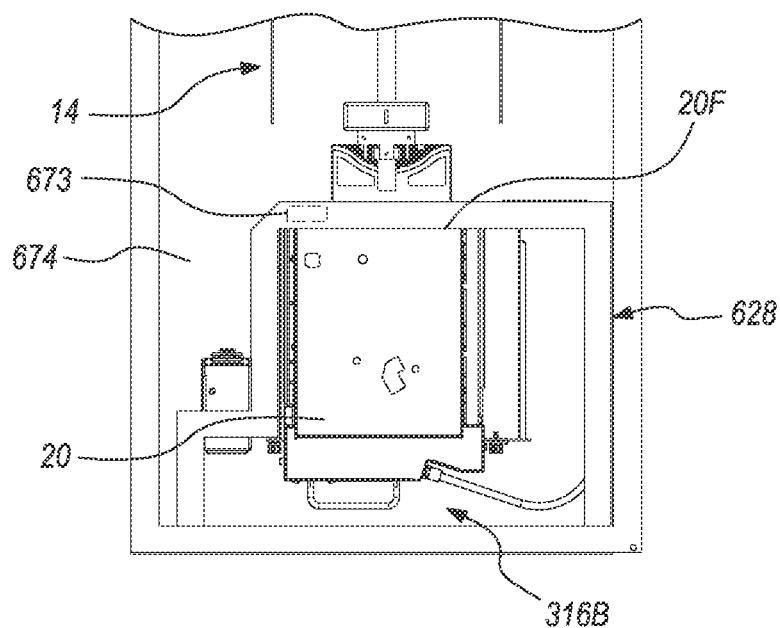
FIG. 6B is a simplified top view illustration of a portion of the thermal dispersion assembly illustrated in FIG. 6A.
Figure 6C:
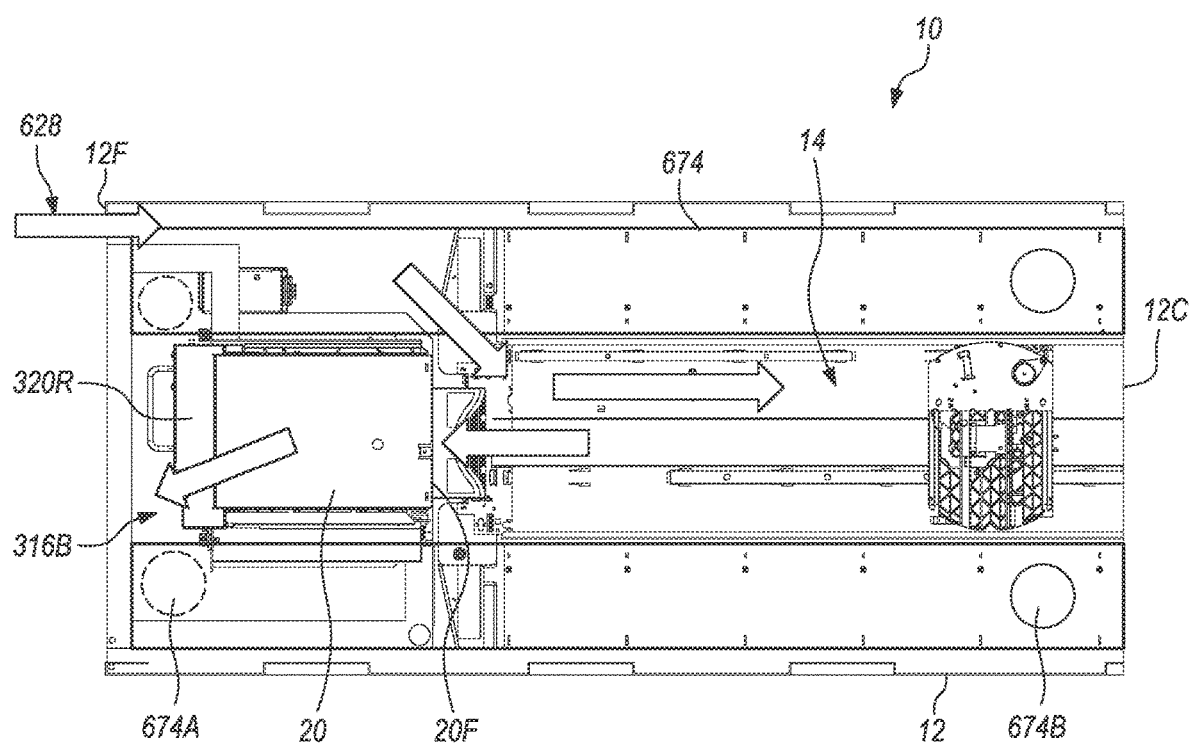
FIG. 6C is a simplified top view illustration of the automated tape library of FIG. 1, which illustrates air flow due to the design of the thermal dispersion assembly of FIG. 6A.

The thermal dispersion assembly 28 is configured to effectively disperse any heat generated during use of the tape library 10, most commonly through operation of the one or more tape drives 20 of the tape drive assembly 18 and/or through use of the redundant power supplies 337 (illustrated in FIG. 3), so that such heat is removed from within the library interior 14 and/or from within the front door 16. More particularly, the thermal dispersion assembly 28 is configured to coordinate air flow into and through the tape library 10, including into and through the library interior 14 (illustrated in FIG. 1), before being discharged as heated air into an area outside the tape library but which is not typically occupied by the user or operator. In various embodiments, the heated air is discharged out a top of the tape library 10, rather than into an aisle at the rear of the tape library 10 as is often done with prior art tape libraries, which creates hot aisles adjacent that must be monitored and/or compensated for. FIGS. 6A-6C provide a detailed illustration of various aspects of the thermal dispersion assembly 28, with FIG. 6C specifically illustrating the general air flow path into and through the tape library 10.

Referring now to FIG. 6A, FIG. 6A is a simplified perspective view illustration of a portion of an embodiment of a thermal dispersion assembly 628 usable as part of the automated tape library 10 of FIG. 1. The design of the thermal dispersion assembly 628 can be varied. In certain embodiments, the thermal dispersion assembly 628 can be configured, at least in part, within the front door 316, such as within the door cavity 316B as defined by the door body 316A. In various embodiments, the thermal dispersion assembly 628 can include one or more of an air intake 670, such as in the form of intake vents, fans 672 (illustrated in phantom), and exhaust ducts 674 having duct inlets 674A and duct outlets 674B (illustrated in FIG. 1). Alternatively, the thermal dispersion assembly 628 can include more components or fewer components than what is illustrated and described herein.

As shown, the air intake 670 can be provided in the form of air intake vents that are formed through the door body 316A of the front door 316. The air intake 670 draws air through the front door 316 and into the library interior 14 (illustrated in FIG. 6C). The air moves through the library interior 14 and then can be drawn in through the drive front 20F (illustrated in FIG. 1) of the tape drives 20, e.g., with one or more drive fans 673 (illustrated in phantom in FIG. 6B) positioned near the drive front 20F, to subsequently be exhausted out within the door cavity 316B through the drive rear 320R of the tape drives 20, as heated air, during use of the tape drives 20. Air can similarly be drawn into the redundant power supplies 337 and exhausted out within the door cavity 316B, as additional heated air, during use of the redundant power supplies 337.

The fans 672 can be positioned in any suitable manner in order to move the heated air in a generally upward direction within the door cavity 316B adjacent to the drive rear 320R of the tape drives 20. In particular, in some embodiments, the fans 672 can create a vacuum source that sucks the heated air in a generally upward direction toward the exhaust ducts 674, so that the heated air is directed and/or blown into the exhaust ducts 674 through the duct inlets 674A. The fans 672 are further configured to move and/or blow the heated air along a length of the exhaust ducts 674 before the heated air is vented into the ambient environment through the duct outlets 674B of the exhaust ducts 674.

FIG. 6B is a simplified top view illustration of a portion of the thermal dispersion assembly 628 illustrated in FIG. 6A. In particular, FIG. 6B illustrates that the door cavity 316B can be provided in the form of a sealed box, which generates a thermal tunnel through which the heated air is directed in a generally upward direction toward the exhaust ducts 674. It is appreciated that the sealed box can further be provided, at least in part, due to the presence of the drive access door 336 (illustrated in FIG. 3) that is coupled to the front door 316.

FIG. 6B further illustrates the one or more drive fans 673 positioned in the tape drive 20 near the drive front 20F, which can be used to draw the air from within the library interior 14 into the tape drives 20, before heated air is exhausted from the tape drives 20 into the sealed door cavity 316B. Although the drive fan 673 is illustrated near the drive front 20F in FIG. 6B, it is understood that the drive fan 673 can be positioned anywhere within the tape drive 20.

FIG. 6C is a simplified top view illustration of the automated tape library 10 of FIG. 1, which illustrates air flow due to the design of the thermal dispersion assembly 628 of FIG. 6A. As shown, the ambient air from the cool aisle adjacent to the housing front 12F of the library housing 12 is drawn into the library interior 14 through the air intake 670 (illustrated more clearly in FIG. 6A).

The cool, ambient air moves into and through the library interior 14 toward the housing rear 12C before then moving back toward the tape drives 20. Such cool air is then drawn into the tape drives 20 through the drive front 20F in the manner as described above. Through use of the tape drives 20 (and/or the redundant power supplies 337 (illustrated in FIG. 6A)), heated air is then exhausted out of the drive rear 320R (and/or the rear of the redundant power supplies 337) and into the door cavity 316B.

The heated air is then moved in a generally upward direction toward the exhaust ducts 674 (shown generally as transparent so that other portions of the automated tape library 10 within the library interior 14 are seen more clearly), so that the heated air is directed and/or blown into the exhaust ducts 674 (one exhaust duct 674 is shown toward each side of the library housing 12) through the duct inlets 674A (illustrated in phantom), and is moved and/or blown along a length of the exhaust ducts 674, before the heated air is vented into the ambient environment through the duct outlets 674B.

Returning again to FIG. 1, the power/communications assembly 30 is configured to establish and organize all necessary and desired power and communications resources so as to effectively support the desired operation of the tape drive 10. As shown in FIG. 1, in certain embodiments, the power/communications assembly 30 can be positioned, in large part, substantially adjacent to the housing rear 12C of the library housing 12.

Figure 7A:
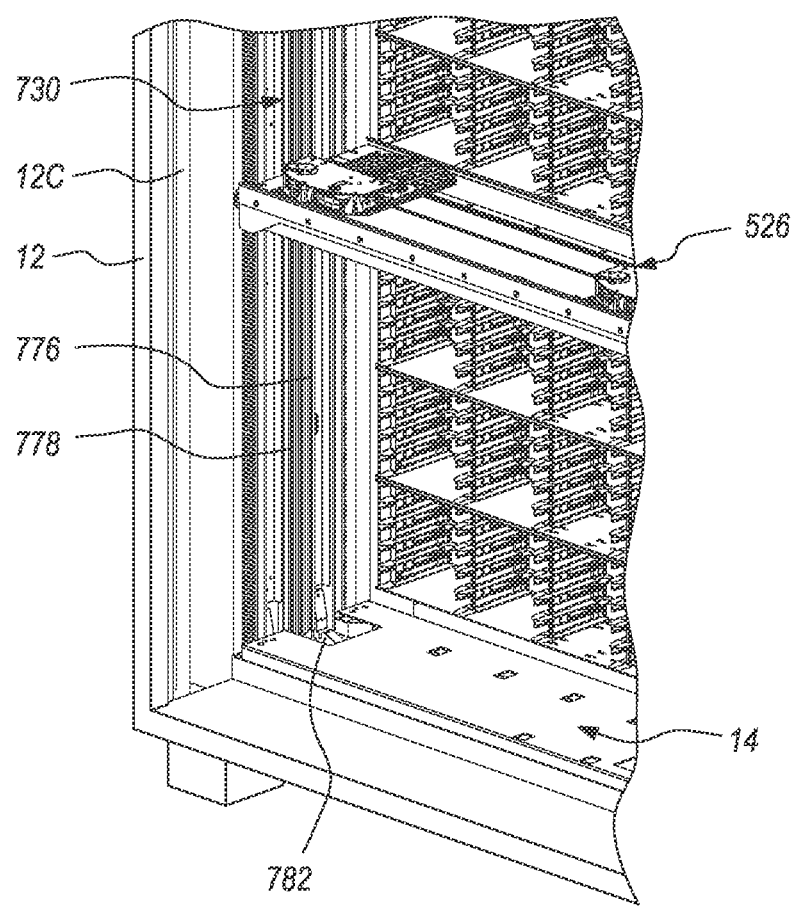
FIG. 7A is a simplified perspective view illustration of a portion of an embodiment of a power/communications assembly usable as part of the automated tape library of FIG. 1.

Referring now to FIG. 7A, FIG. 7A is a simplified perspective view illustration of a portion of an embodiment of a power/communications assembly 730 usable as part of the automated tape library 10 of FIG. 1. The design of the power/communications assembly 730 can be varied depending upon the specific requirements of the tape library 10. In certain embodiments, the power/communications assembly 730 can include one or more of at least one power rail 776, at least one signal rail 778, an electrical connection assembly 780 (or "pick-up assembly", illustrated in FIG. 7B), an assembly guide system 782, and a cable channel 784 (illustrated in FIG. 7D). Alternatively, the power/communications assembly 730 can have a different design that can include more components or fewer components than what is specifically illustrated and described herein.

The at least one power rail 776 is configured to provide necessary electrical power to certain components of the tape library 10. For example, in various embodiments, the at least one power rail 776 is configured to provide necessary electrical power to the cartridge mover assembly 526. Additionally, or in the alternative, in some embodiments, the at least one power rail 776 is configured to provide electrical power to one or more of the tape drive system 18 (illustrated in FIG. 1) including the one or more tape drives 20 (illustrated in FIG. 1), the cartridge mover assembly 526, the thermal dispersion assembly 28 (illustrated in FIG. 1), and the control system 32 (illustrated in FIG. 1). In one embodiment, the at least one power rail 776 can also be configured to provide necessary electrical power to additional tape libraries 10. The at least one power rail 776 can be interfaced with these components as well as with an external power source in a well-known manner using industry standard cabling and connections. Alternatively, the at least one power rail 776 can be interfaced with these components in another manner. Still alternatively, an additional power source (not shown) can be included to provide necessary electrical power to one or more of the tape drive system 18 including the one or more tape drives 20, the thermal dispersion assembly 28, and the control system 32.

The at least one signal rail 778 is configured to transmit signals to and from and/or between the cartridge mover assembly 526 and the control system 32 and/or the tape drive system 18.

As illustrated, in certain embodiments, the at least one power rail 776 and the at least one signal rail 778 can be positioned substantially vertically and adjacent to one another substantially adjacent to the housing rear 12C of the library housing 12.

In various embodiments, the power/communications assembly 730, including the at least one power rail 776 and the at least one signal rail 778, can be removed from within the library interior 14 through the open front door 16 (illustrated in FIG. 1).

Figure 7B:
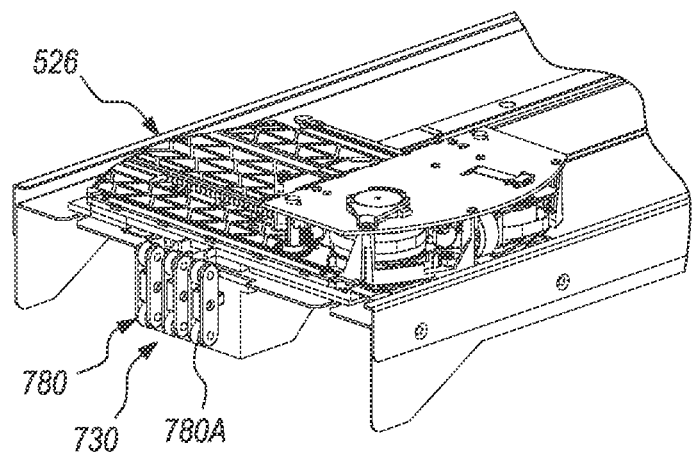
FIG. 7B is a simplified perspective view illustration of another portion of the power/communications assembly illustrated in FIG. 7A.

FIG. 7B is a simplified perspective view illustration of another portion of the power/communications assembly 730 illustrated in FIG. 7A. In particular, FIG. 7B is a simplified perspective view illustration of an embodiment of the electrical connector assembly 780 that can be coupled to the cartridge mover assembly 526. More specifically, as shown, the electrical connector assembly 780 can include a plurality of electrical contacts 780A that are configured to selectively engage the at least one power rail 776 (illustrated in FIG. 7A) and the at least one signal rail 778 (illustrated in FIG. 7A) when the cartridge mover assembly 526 is mounted within the tape library 10 (illustrated in FIG. 1). The electrical contacts 780A are configured to remain in contact with the at least one power rail 776 and the at least one signal rail 778 as the cartridge mover assembly 526 moves up and down relative to and/or along the rack assembly 54 (illustrated in FIG. 7C). With such design, desired power and signals can be effectively transmitted to and from the cartridge mover assembly 526 during use of the tape library 10.

Figure 7C:
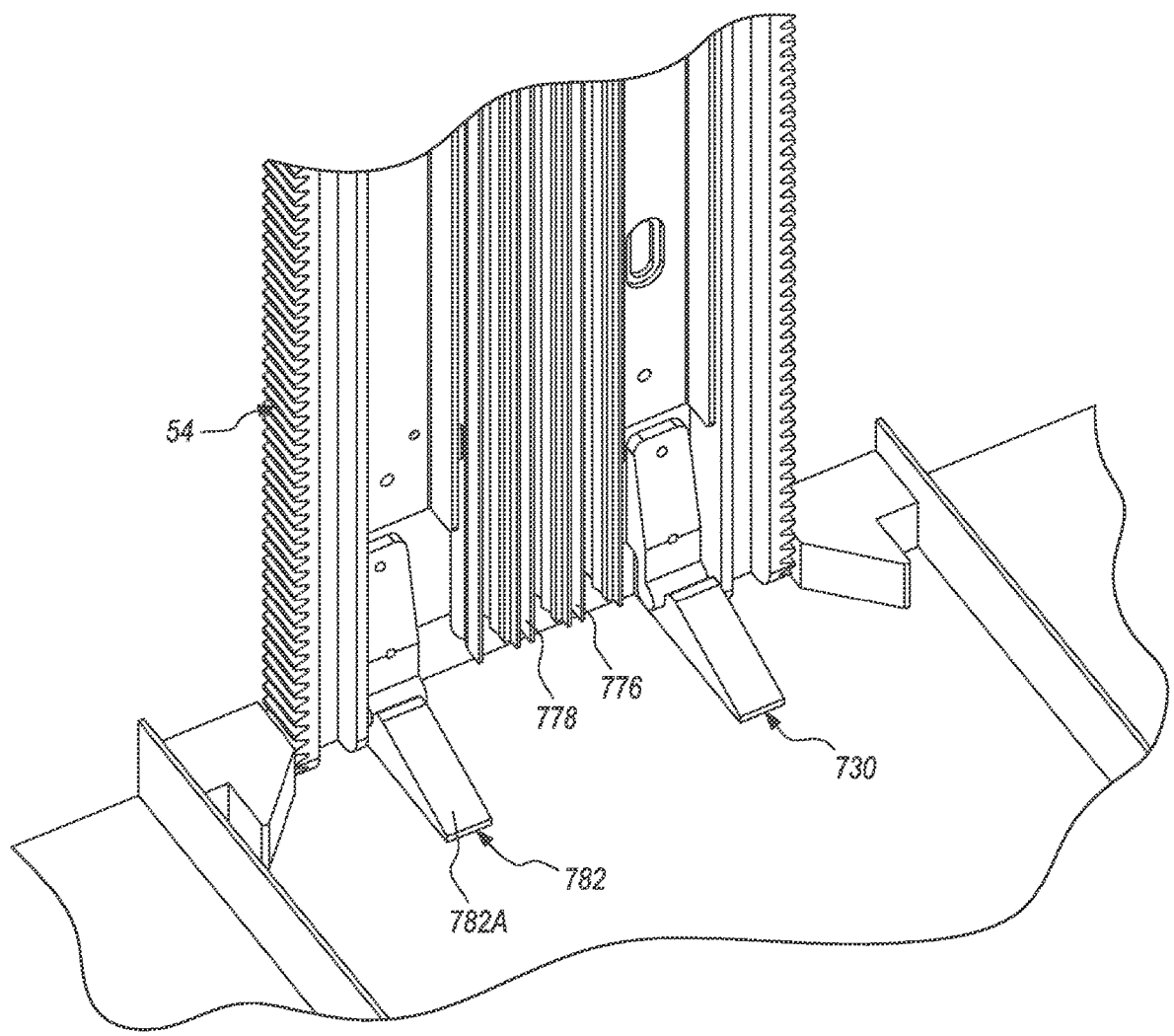
FIG. 7C is a simplified perspective view illustration of still another portion of the power/communications assembly illustrated in FIG. 7A.

FIG. 7C is a simplified perspective view illustration of still another portion of the power/communications assembly 730 illustrated in FIG. 7A. In particular, FIG. 7C is a simplified perspective view illustration of a portion of the at least one power rail 776, a portion of the at least one signal rail 778, and the assembly guide system 782 that positions the power rail(s) 776 and guides installation of the power rail(s) 776. The electrical contacts 780A (illustrated in FIG. 7B) of the electrical connector assembly 780 (illustrated in FIG. 7B) are in electrical contact with the at least one power rail 776 and the at least one signal rail 778 as the cartridge mover assembly 526 is mounted within the tape library 10 (illustrated in FIG. 1). In some embodiments, the assembly guide system 782 can include one or more guide ramps 782A that guide the positioning of the cartridge mover assembly 526 in a slightly vertical direction to ensure the desired electrical connection between the electrical contacts 780A and the at least one power rail 776 and the at least one signal rail 778.

Figure 7D:
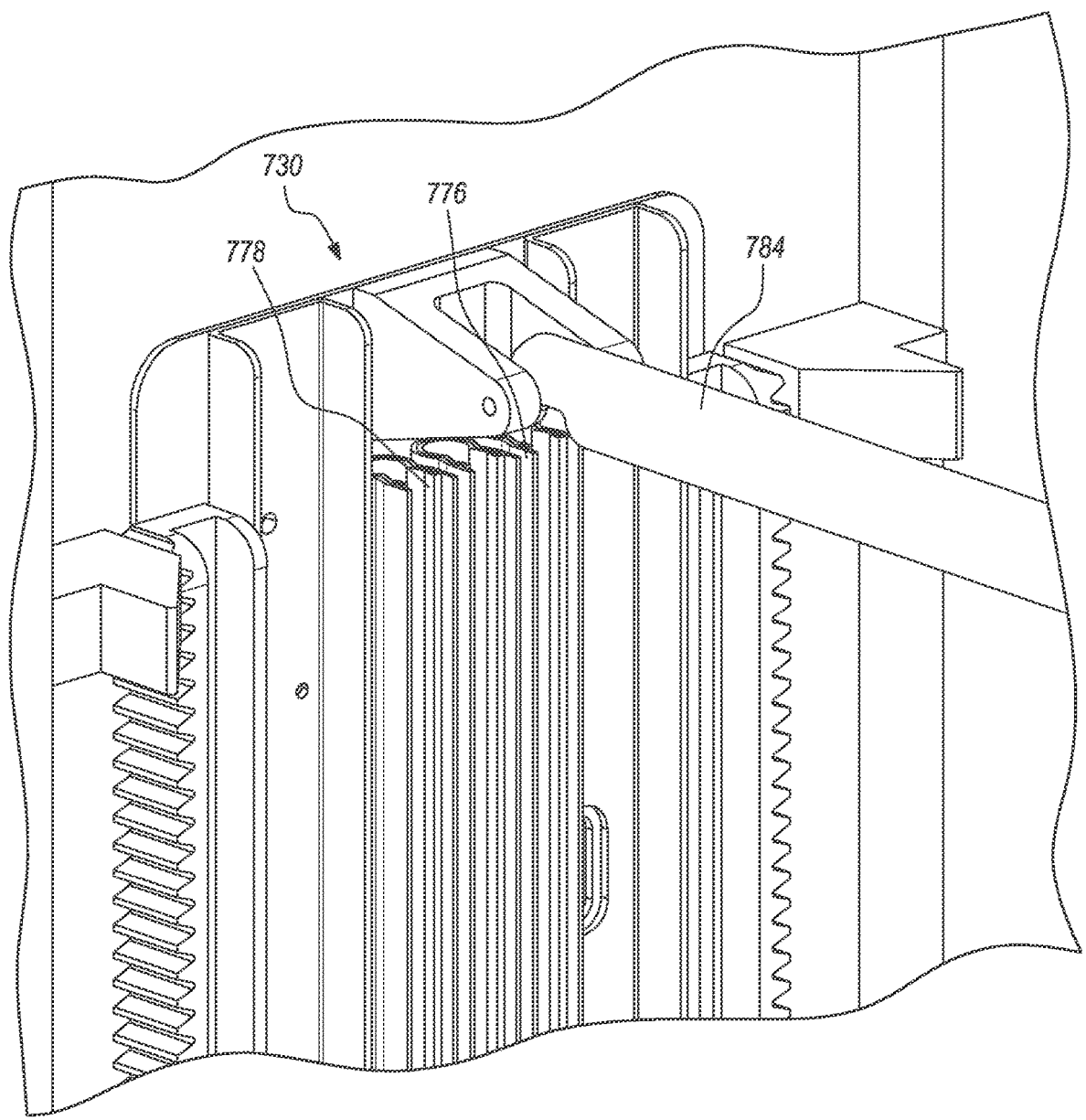
FIG. 7D is a simplified perspective view illustration of yet another portion of the power/communications assembly illustrated in FIG. 7A.

FIG. 7D is a simplified perspective view illustration of yet another portion of the power/communications assembly 730 illustrated in FIG. 7A. In particular, FIG. 7D is a simplified perspective view illustration of an upper portion of the at least one power rail 776 and the at least one signal rail 778, and the cable channel 784. The cable channel 784 is configured to provide a conduit through which power cables and signal cables can extend such that the desired power and signals can be transmitted between the at least one power rail 776 and the at least one signal rail 778, and the control system 32, the cartridge mover assembly 526, and/or the tape drives 20 (illustrated in FIG. 1) of the tape drive system 18 (illustrated in FIG. 1).

Returning again to FIG. 1, the control system 32 provides the desired and necessary control for general functionality of the tape library 10. The control system 32 can have any suitable design, many of which are well-known in the industry. For example, in one embodiment, the control system 32 can include a standard driver interface unit for receiving digital commands and translating the commands into driving currents, such as step pulses for controlling stepper motors, and/or for controlling the cartridge mover assembly 26. The control system 32 can include a standard programmable general-purpose computer formed on a single plug-in card unit and can include a programmed microprocessor or microcontroller, memory, communication interface, control interface, connectors, etc. Alternatively, the control system 32 can have a different design and/or the control system 32 can be positioned within the tape library 10 in a different position or manner than that illustrated in FIG. 1.

Figure 8A:
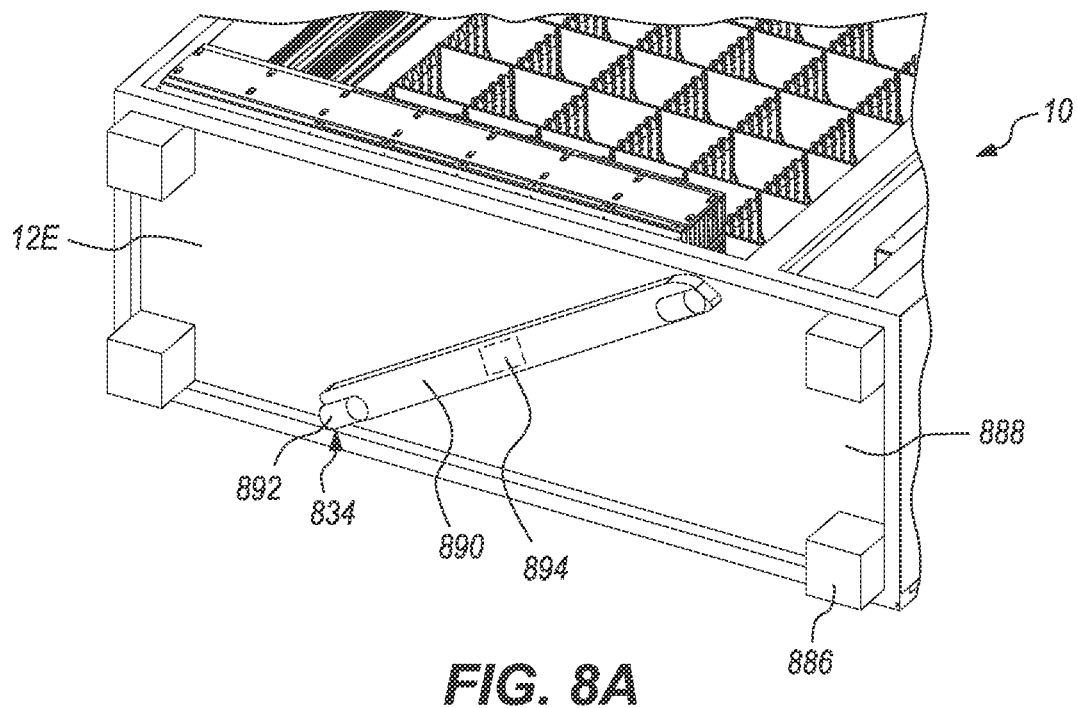
FIG. 8A is a simplified bottom perspective view illustration of a portion of the automated tape library of FIG. 1 including a housing stabilization system usable as part of the automated tape library, the housing stabilization system being shown in a first configuration.
Figure 8B:
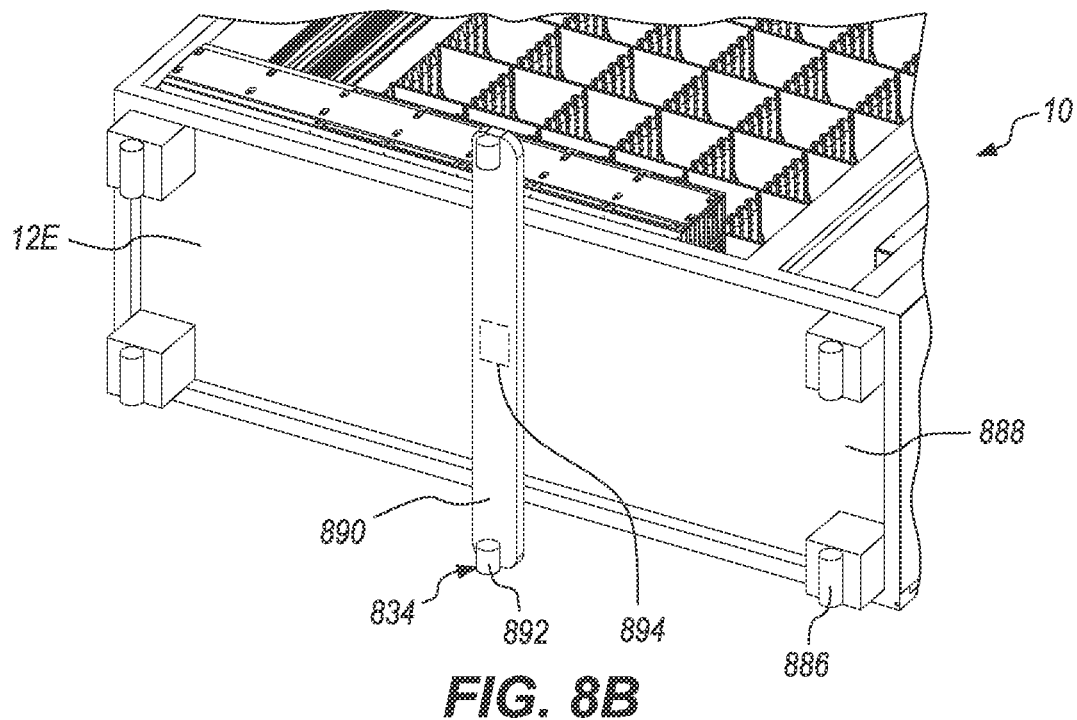
FIG. 8B is a simplified bottom perspective view illustration of the housing stabilization system illustrated in FIG. 8A, the housing stabilization system being shown in a second configuration.

Referring now to FIG. 8A, FIG. 8A is a simplified bottom perspective view illustration of a portion of the automated tape library 10 of FIG. 1, including an embodiment of the housing stabilization system 834 usable as part of the automated tape library 10. As shown in FIG. 8A, the housing stabilization system 834 is in a first (stowed) configuration. Additionally, FIG. 8B is a simplified bottom perspective view of the housing stabilization system 834 illustrated in FIG. 8A, the housing stabilization system 834 being shown in a second (operative) configuration that is different than the first configuration.

The housing stabilization system 834 is configured to provide effective stabilization for the tape library 10, particularly during movement of the tape library 10, due to the narrow, reduced form factor of the tape library 10 which may otherwise result in undesired instability (e.g., potential tipping) of the tape library 10. Certain design features and components of embodiments of the housing stabilization system 834, as well as the general operation thereof, are described in detail in relation to FIGS. 8A and 8B.

The design of the housing stabilization system 834 can be varied. As illustrated in FIGS. 8A and 8B, in certain embodiments, the housing stabilization system 834 can include (i) a plurality of convertible feet 886, e.g., casters or skids in certain non-exclusive embodiments, that are mounted on a bottom surface 888 of the housing bottom 12E; (ii) a stabilizer bar 890, in the form of a long, thin, rectangular bar, which is rotatably mounted on the bottom surface 888 of the housing bottom 12E; (iii) a pair of opposed stabilizer wheels 892, which are coupled to opposing ends of the stabilizer bar 890; and (iv) a stabilizer mover 894 (illustrated in phantom) that is configured to selectively move the stabilizer bar 890 between a stowed configuration (as shown in FIG. 8A) and an operative configuration (as shown in FIG. 8B). Alternatively, the housing stabilization system 834 can have another suitable design.

When the tape library 10 is in a desired position relative to walls, other tape libraries, etc. in a desired space, the convertible feet 886 can provide a solid base, and the stabilizer bar 890 can be in the stowed configuration so that the stabilizer bar 890 is positioned substantially directly adjacent to the bottom surface 888 of the housing bottom 12E and does not interfere with the positioning of any adjacent tape libraries 10 and/or result in the tape library 10 expanding its operational footprint beyond the confines of the library housing 12. Stated in another manner, when the housing stabilization system 834 and/or the stabilizer bar 890 is in the stowed configuration, only the solid base provided by the convertible feet 886 will engage the support surface.

Conversely, when it is desired to move the tape library 10 to another suitable or desired location, the convertible feet 886 can be converted to a wheeled support base, and the stabilizer bar 890 can be moved and/or rotated to the operative configuration, via the stabilizer mover 894, where the stabilizer bar 890 is moved away from the bottom surface 888 of the housing bottom 12E and extends beyond the operational footprint of the library housing 12 so that the tape library 10 is better and more stably supported during such movement. Stated in another manner, when the housing stabilization system 834 and/or the stabilizer bar 890 is in the operative configuration, the convertible feet 886 can provide a wheeled support base relative to the support surface, and the stabilizer wheels 892 are also configured to engage the support surface.

As noted above, in some embodiments, the tape library 10 can also include the GUI, e.g., an interactive touchscreen display or another suitable graphical user interface, which allows the user to interact with and/or transmit requests or commands to the tape library 10. For example, the GUI can allow the user to transmit requests for moving certain tape cartridges 24, such as with the cartridge mover assembly 26, between the storage slots 42 and the tape drives 20.

As described herein, tape storage density is a critical factor for customers that rely on storage of large quantities of tape cartridges. Another key factor for customers is accessibility to ensure that all components of the automated tape library can be readily accessed for service, repair and/or replacement. With the teaching of the present invention, the automated tape library has a more densely packed storage capacity, and the automated tape library is fully accessible, only requiring front door access. As a result, the library can be back up against a wall and stood side to side in contact with each other.

Figure 9A:
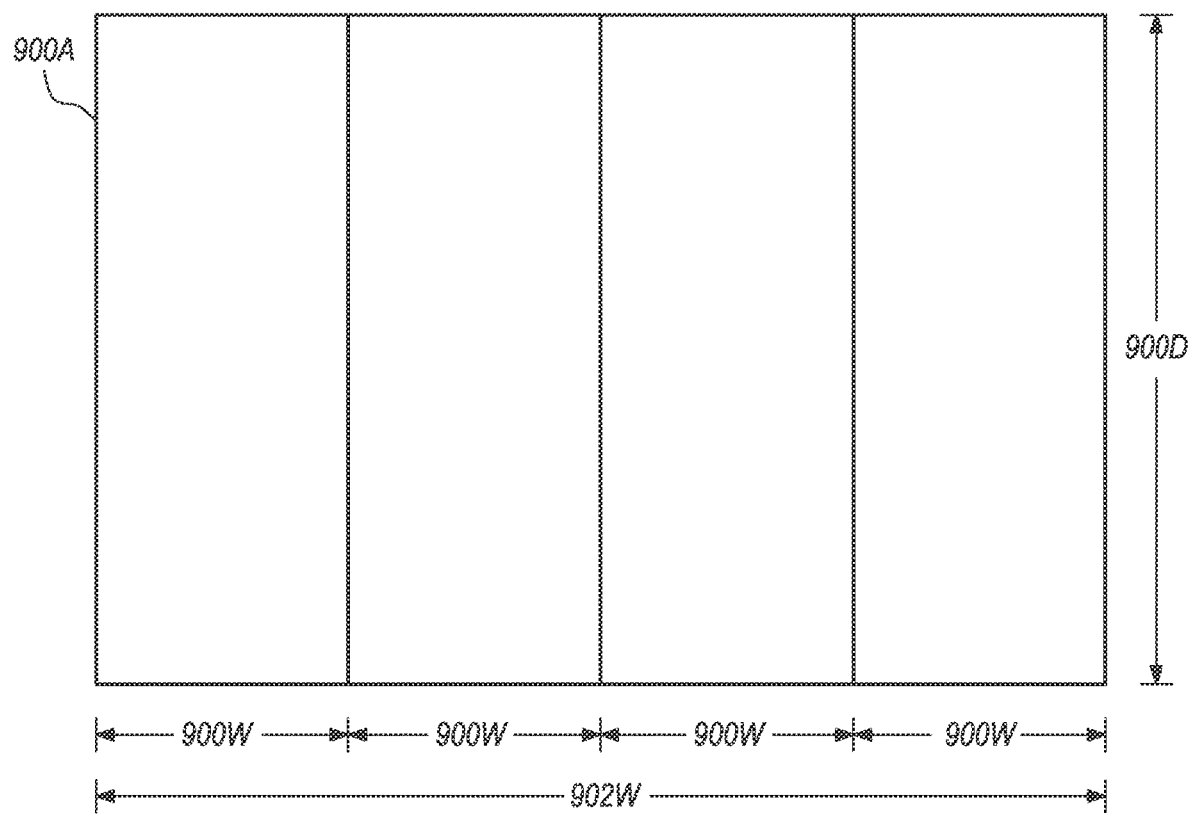
FIG. 9A is a simplified schematic illustration of a plurality of automated tape libraries having features of the present invention positioned in a side-by-side arrangement.

FIG. 9A is a simplified schematic illustration of a plurality of automated tape libraries 900A that show the required spacing or footprint for four such automated tape libraries 900A positioned in a side-by-side arrangement. In certain non-exclusive alternative embodiments, each of the automated tape libraries 900A can have a library width 900W of less than approximately 600 mm, less than or equal to approximately 575 mm, less than or equal to approximately 550 mm, less than or equal to approximately 525 mm, less than or equal to approximately 500 mm, less than or equal to approximately 475 mm, or less than or equal to approximately 450 mm. In some embodiments, each of the tape libraries 900A can have a library depth 900D of between approximately 800 mm and 1600 mm (at least approximately 800 mm), between approximately 1000 mm and 1400 mm (at least approximately 1000 mm), between approximately 1100 mm and 1300 mm (at least approximately 1100 mm), or approximately 1200 mm. Alternatively, the dimensions of the tape libraries 900A can be greater than or less than the specific dimensions noted above.

Figure 10A:
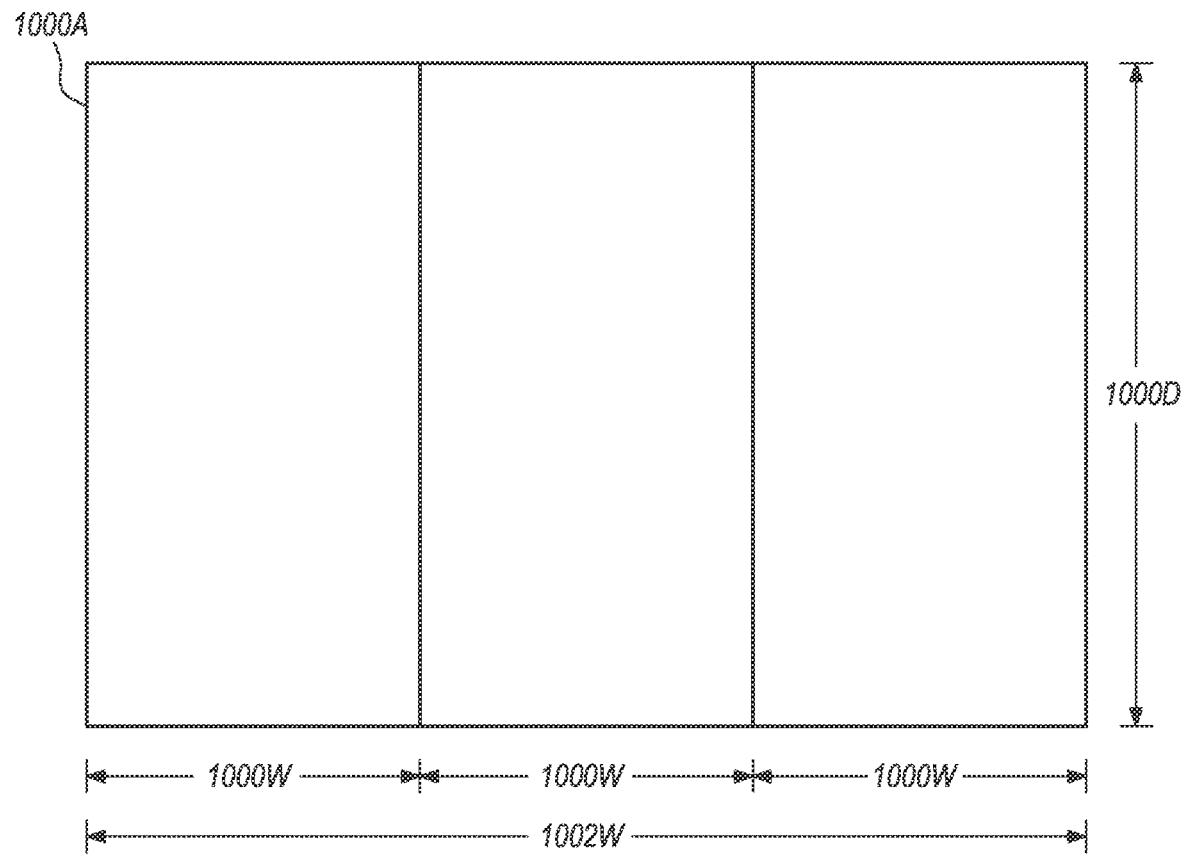
FIG. 10A is a simplified schematic illustration of a plurality of prior art automated tape libraries positioned in a side-by-side arrangement.

In one specific non-exclusive embodiment, each of such automated tape libraries 900A can have a library width 900W of 450 mm and a library depth 900D of 1200 mm. With such design, four such automated tape libraries 900A positioned in a side-by-side arrangement have an overall footprint width 902W of 1800 mm. Thus, in comparison to the prior art automated tape libraries 1000A illustrated in FIG. 10A, with use of the present invention, a customer can position four automated tape libraries 900A within the same overall footprint width 902W as compared to only three of the prior art automated tape libraries 1000A.

Additionally, the automated tape libraries 900A of the present invention are configured to retain up to 1200 tape cartridges (with a separate storage slot for each tape cartridge). Thus, using four such automated tape libraries 900A, a customer is able to retain up to 4800 tape cartridges (each within a separate storage slot) within the overall footprint width 902W of 1800 mm. This provides an increased tape storage density of approximately 77% in comparison to the 2700 tape cartridges that can be stored within the overall footprint width 1002W of the prior art automated tape cartridges 1000A.

Figure 9B:
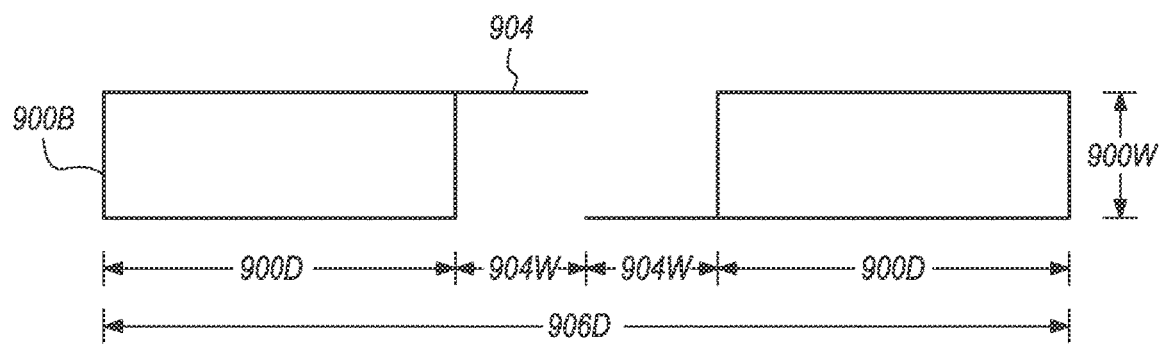
FIG. 9B is a simplified schematic illustration of a plurality of automated tape libraries having features of the present invention positioned in an end facing arrangement.
Figure 10B:
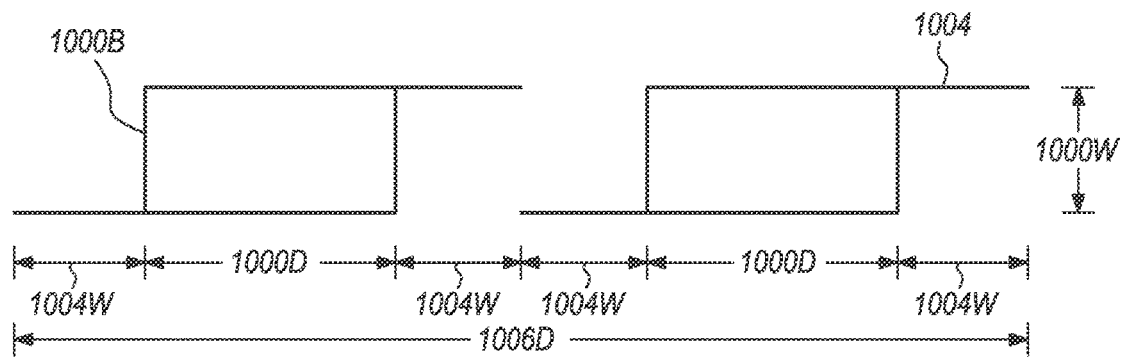
FIG. 10B is a simplified schematic illustration of a plurality of prior art automated tape libraries positioned in an end facing arrangement.

FIG. 9B is a simplified schematic illustration of a plurality of automated tape libraries 900B that show the required spacing or footprint for two such automated tape libraries 900B positioned in an end facing arrangement where access to only one end of the automated tape libraries 900B is required. Stated in another manner, with two automated tape libraries 900B positioned in an end facing arrangement, only one aisle is required to gain full access to each of the automated tape libraries 900B, between the two automated tape libraries 900B, as opposed to the three aisles that are required in the prior art automated tape libraries 1000B (illustrated in FIG. 10B).

As illustrated, in one specific non-exclusive embodiment, each of such automated tape libraries 900B again have a library width 900W of 450 mm and a library depth 900D of 1200 mm. With access doors 904 for the automated tape library 900B that are substantially equal to the library width 900W, the access doors 904 have a door width 904W that is also 450 mm. Thus, with two such automated tape libraries 900B positioned in such an end facing arrangement, with proper space allowances for the access door 904 at one end of the automated tape libraries 900B to be fully opened to effectively access the interior components, an overall footprint depth 906D of 3300 mm is required. More specifically, the overall footprint depth 906D requires spacing for two automated tape libraries that each have a library depth of 1200 mm, and additional spacing for only front access doors 904 on each of the automated tape libraries 900B (or two total access doors 904) each having a door width 904W of 450 mm, for a total overall footprint depth 906D of 3300 mm.

Thus, with each automated tape library 900B being configured to retain up to 1200 tape cartridges (with a separate storage slot for each tape cartridge), the present invention enables up to 2400 tape cartridges to be retained within an overall housing footprint of 3.3 meters×0.45 meters=1.485 square meters. This equates to approximately 1616 tape cartridges per square meter. Comparatively, with the typical design of the prior art automated tape libraries 1000B, such prior art automated tape libraries 1000B enable up to 1800 tape cartridges to be retained within an overall housing footprint of 4.8 meters×0.6 meters=2.88 square meters, or approximately 625 tape cartridges per square meter. As a result, the present invention, in such arrangement, enables a tape storage density that is approximately 2.58 times greater than with the prior art.

In certain non-exclusive alternative embodiments, with the design of the present invention, the library housing defines a library interior that is configured to retain a ratio of tape cartridges (with a separate storage slot for each tape cartridge) to overall housing footprint (in square meters) of at least approximately 700:1, 750:1, 800:1, 850:1, 900:1, 950:1, 1000:1, 1050:1, 1100:1, 1150:1, 1200:1, 1250:1, 1300:1, 1350:1, 1400:1, 1450:1, 1500:1, 1550:1 or 1600:1.

It is understood that although a number of different embodiments of the tape library 10 have been illustrated and described herein, one or more features of any one embodiment can be combined with one or more features of one or more of the other embodiments, provided that such combination satisfies the intent of the present invention.

While a number of exemplary aspects and embodiments of the tape library 10 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. An automated tape library comprising:
   a library housing that is substantially rectangular box-shaped and defines a library interior, including a first housing side, a second housing side, a housing rear, a housing top, a housing bottom, and a housing front; and
   a front door that is movably coupled to the housing front to move between (i) a closed configuration wherein the front door closes the housing front to inhibit access to the library interior, and (ii) an open configuration wherein the housing front has been selectively opened to provide access to the library interior;
   wherein the library housing defines a library width that is less than or equal to approximately 550 millimeters and a library depth that is at least approximately 1000 millimeters;
   wherein the library width is measured from the first housing side to the second housing side; and
   wherein the library depth is measured from the housing front to the housing rear.

2. The automated tape library of claim 1 wherein the library width is less than or equal to approximately 450 millimeters.

3. The automated tape library of claim 1 wherein the library housing is sized so as to define a ratio of the library depth (in mm) to the library width (in mm) of at least approximately 2.40:1.

4. The automated tape library of claim 1 wherein full access to the library interior is only provided through the front door when the front door has been moved to the open configuration.

5. The automated tape library of claim 1 further comprising at least one tape drive that is coupled to the front door.

6. The automated tape library of claim 5 wherein the front door includes a door body that defines a door cavity therein and a drive access door that is movably coupled to the door body; wherein the at least one tape drive is positioned substantially within the door cavity; and wherein the at least one tape drive is selectively removable from the door cavity when the drive access door has been opened relative to the door body.

7. The automated tape library of claim 5 wherein movement of the front door between the closed configuration and the open configuration causes corresponding movement of the at least one tape drive relative to the library housing.

8. The automated tape library of claim 1 further comprising at least two tape magazines that are selectively positionable within the library interior, each of the at least two tape magazines including a plurality of storage slots, each storage slot being configured to selectively receive and retain a tape cartridge; and wherein the at least two tape magazines are removable from the library interior through the front door when the front door is in the open configuration.

9. The automated tape library of claim 8 wherein at least one tape magazine is positioned substantially adjacent to the first housing side; and wherein at least one tape magazine is positioned substantially adjacent to the second housing side.

10. The automated tape library of claim 8 wherein the at least two tape magazines are configured to retain at least approximately 1000 tape cartridges within the library interior.

11. The automated tape library of claim 8 wherein the library interior is configured to retain a ratio of tape cartridges to overall housing footprint (in square meters) of at least approximately 750:1.

12. The automated tape library of claim 8 further comprising at least one tape drive that is coupled to the front door; and a cartridge mover assembly that is configured to selectively move the tape cartridges between the storage slots and the at least one tape drive; and wherein the cartridge mover assembly is selectively removable from the library interior through the front door when the front door is in the open configuration.

13. An automated tape library comprising:
   a library housing that is substantially rectangular box-shaped and defines a library interior, a library depth and a library width, the library housing including a first housing side, a second housing side, a housing rear, a housing top, a housing bottom, and a housing front; and
   a front door that is movably coupled to the housing front to move between (i) a closed configuration wherein the front door closes the housing front to inhibit access to the library interior, and (ii) an open configuration wherein the housing front has been selectively opened to provide access to the library interior;
   wherein the library width is measured from the first housing side to the second housing side;

wherein the library depth is measured from the housing front to the housing rear;

wherein the library housing is sized so as to define a ratio of the library depth (in mm) to the library width (in mm) of at least approximately 2.40:1; and wherein the library width is less than or equal to approximately 575 millimeters.

14. The automated tape library of claim 13 wherein the ratio of the library depth (in mm) to the library width (in mm) is at least approximately 2.65:1.

15. The automated tape library of claim 13 wherein full access to the library interior is only provided through the front door when the front door has been moved to the open configuration.

16. The automated tape library of claim 13 further comprising at least two tape magazines that are selectively positionable within the library interior, each of the at least two tape magazines including a plurality of storage slots, each storage slot being configured to selectively receive and retain a tape cartridge; and wherein the at least two tape magazines are removable from the library interior through the front door when the front door is in the open configuration.

17. The automated tape library of claim 16 wherein the library interior is configured to retain a ratio of tape cartridges to overall housing footprint (in square meters) of at least approximately 750:1.

18. An automated tape library comprising:
a library housing that is substantially rectangular box-shaped and defines a library interior, the library housing including a first housing side, a second housing side, a housing rear, a housing top, a housing bottom, and a housing front;
a front door that is movably coupled to the housing front to move between a closed configuration and an open configuration, the front door including a door body that defines a door cavity therein and a drive access door that is movably coupled to the door body; and
at least one tape drive that is coupled to the front door, the at least one tape drive being positioned substantially within the door cavity;
wherein the library housing defines a library width that is less than or equal to approximately 550 millimeters and a library depth that is at least approximately 1000 millimeters;
wherein full access to the library interior is only provided through the front door when the front door has been moved to the open configuration; and
wherein the at least one tape drive is selectively removable from the door cavity when the drive access door has been opened relative to the door body.

19. The automated tape library of claim 18 further comprising a thermal dispersion assembly that is configured to disperse heat generated during use of the at least one tape drive, the thermal dispersion assembly including (i) an air intake that draws air through the front door and into the library interior, (ii) at least one fan that exhausts heated air from the at least one tape drive into the door cavity so that the heated air moves in a generally upward direction within the door cavity, and (iii) an exhaust duct that is positioned near the housing top of the library housing, the exhaust duct including a duct inlet that receives the heated air from within the door cavity and a duct outlet that vents the heated air away from the library housing.

20. An automated tape library comprising:
a library housing that is substantially rectangular box-shaped and defines a library interior, the library housing including a first housing side, a second housing side, a housing rear, a housing top, a housing bottom, and a housing front;
a front door that is movably coupled to the housing front to move between a closed configuration and an open configuration;
at least two tape magazines that are selectively positionable within the library interior, each of the at least two tape magazines including a plurality of storage slots, each storage slot being configured to selectively receive and retain a tape cartridge;
at least one tape drive that is coupled to the front door; and
a cartridge mover assembly that is configured to selectively move the tape cartridges between the storage slots and the at least one tape drive;
wherein the library housing defines a library width that is less than or equal to approximately 550 millimeters and a library depth that is at least approximately 1000 millimeters;
wherein full access to the library interior is only provided through the front door when the front door has been moved to the open configuration;
wherein the at least two tape magazines are removable from the library interior through the front door when the front door is in the open configuration; and
wherein the cartridge mover assembly is selectively removable from the library interior through the front door when the front door is in the open configuration.

21. The automated tape library of claim 20 further comprising a power rail that is positioned within the library interior, the power rail being configured to provide power to the cartridge mover assembly; and wherein the power rail is selectively removable from the library interior through the front door when the front door is in the open configuration.

* * * * *